(12) United States Patent
Krantz et al.

(10) Patent No.: US 9,559,994 B2
(45) Date of Patent: *Jan. 31, 2017

(54) SYSTEMS AND METHODS FOR PREVIEWING COMMUNICATIONS SESSIONS

(71) Applicant: AOL Inc., Dulles, VA (US)

(72) Inventors: Kristine Amber Krantz, Cincinnati, OH (US); Peiliang Pan, Falls Church, VA (US); Daniel Ernest Smith, Metairie, LA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,389

(22) Filed: Dec. 29, 2015

(65) Prior Publication Data

US 2016/0112354 A1 Apr. 21, 2016

Related U.S. Application Data

(63) Continuation of application No. 13/893,233, filed on May 13, 2013, now Pat. No. 9,240,963, which is a
(Continued)

(51) Int. Cl.
*H04L 12/58* (2006.01)
*H04L 12/18* (2006.01)
*H04L 29/08* (2006.01)

(52) U.S. Cl.
CPC ........... *H04L 51/04* (2013.01); *H04L 12/1822* (2013.01); *H04L 67/02* (2013.01); *H04L 67/14* (2013.01)

(58) Field of Classification Search
None
See application file for complete search history.

(56) References Cited

U.S. PATENT DOCUMENTS 6,393,460 B1 5/2002 Gruen et al.
6,393,461 B1 5/2002 Okada et al.
(Continued)

OTHER PUBLICATIONS

"Welcome to the mIRC Homepage!"; http://www.mire.com/; 3 pages.
"Latest news about mIRC"; http://www.mirc.com/.news.html; 9 pages.
"IRC FAQ. Introduction to IRC for people using Windows"; http://www.mirc.com/ircintro.html; 23 pages.
"What is IRC?"; http://www.mirc.com/irc.html; 4 pages.
"Introduction to mIRC"; http://www.mirc.com/mirc.com/.html; 4 pages.
"Frequently Asked Questions about mIRC"; http://www.mirc.com/faq..html; 25 pages.
"Commands available in mIRC"; http://www.mirc.com/cmds.html; 4 pages.
"Services and IRC Networks"; http://www.mirc.com/servers.html; 4 pages.
(Continued)

*Primary Examiner* — Peling Shaw
(74) *Attorney, Agent, or Firm* — Finnegan, Henderson, Farabow, Garrett & Dunner, LLP

(57) ABSTRACT

A system and method allows a user to view communications exchanged between other participants within an online chat room without the user becoming a participant within the online chat room. The online chat room enables ongoing exchanges of electronic communications between two or more participants whose participation within the chat room are mutually revealed to each other. A user is enabled to perceive the existence of the online chat room without the user becoming a participant within the online chat room. Selection of the online chat room by the user is received. Responsive to user selection of the online chat room and without the user becoming a participant within the online chat room, at least some of the communications exchanged between the participants within the online chat room are made perceivable to the user as the communications are exchanged.

20 Claims, 22 Drawing Sheets

Related U.S. Application Data continuation of application No. 11/019,537, filed on Dec. 23, 2004, now Pat. No. 8,443,041.

(60) Provisional application No. 60/584,477, filed on Jul. 2, 2004.

(56) References Cited

U.S. PATENT DOCUMENTS

| | | | |
|---|---|---|---|
| 6,442,590 B1 * | 8/2002 | Inala | H04L 29/06 |
| | | | 709/203 |
| 6,606,644 B1 * | 8/2003 | Ford | G06F 17/30864 |
| | | | 707/999.003 |
| 6,678,720 B1 | 1/2004 | Matsumoto et al. | |
| 7,346,658 B2 * | 3/2008 | Simpson | G06Q 40/04 |
| | | | 379/13 |
| 2003/0078972 A1 * | 4/2003 | Tapissier | H04L 12/1822 |
| | | | 709/204 |
| 2003/0195928 A1 | 10/2003 | Kamijo et al. | |
| 2004/0111479 A1 * | 6/2004 | Borden | G06Q 10/107 |
| | | | 709/206 |
| 2004/0210639 A1 * | 10/2004 | Ben-Yoseph | H04L 12/5815 |
| | | | 709/206 |

OTHER PUBLICATIONS

"Links and References to more mIRC and IRC information"; http//www.mirc.com/links.html; 4 pages.

\* cited by examiner

FIG. 8A

| IF UNABLE TO DISPLAY DUE TO: | THEN OUT OF CLIENT SHOW: | THEN IN CLIENT SHOW: |
|---|---|---|
| PARENTAL CONTROLS | SORRY! YOUR SCREEN NAME HAS BEEN BLOCKED FROM VIEWING THIS CHAT ROOM. FOR MORE INFORMATION, VISIT AOL PARENTAL CONTROLS.<br><br>(LINK TO HTTP://WWW.AOL.COM/PRODUCT/PARENT.ADP) | SORRY! YOUR ACCOUNT NAME HAS BEEN BLOCKED FROM VIEWING THIS CHAT ROOM. FOR MORE INFORMATION, VISIT AOL KEYWORDS <u>PARENTAL CONTROL</u>. ???<br>???)<br>• ???<br>• ??? |
| UNSUPPORTED/ BROWSER | SORRY! YOUR BROWSER DOESN'T SUPPORT VIEWING THIS CHAT ROOM<br>CLICK HERE TO UPGRADE TO THE BETTER VERSIONS OF:<br>• NETSCAPE:<br>   LINKS TO:<br>   HTTP://???<br>• INTERNET EXPLORER:<br>   LINKS TO:<br>   HTTP://??? | SORRY@ YOUR BROWSER DOESN'T SUPPORT VIEWING THIS CHAT ROOM. PLEASE VISIT KEYWORD: ???, ??? <u>UPGRADE</u> ???) LINKS TO AOL |
| SYSTEM ERROR | SORRY! WE ARE UNABLE TO DISPLAY THIS ROOM. PLEASE TRY AGAIN SOON! | SORRY! WE ARE UNABLE TO DISPLAY THIS ROOM. TO SEARCH FOR RELATED CHAT ROOMS, VISIT AOL KEYWORD: <u>CHAT SEARCH</u>. (LINKS TO: HTTP://AOLSEARCH???)<br>TO SEE THIS ??? IN THE AOL COMMUNITY, VISIT AOL KEYWORD ??? (LINKS TO ???) |

FIG. 9

SYSTEMS AND METHODS FOR PREVIEWING COMMUNICATIONS SESSIONS

CLAIM OF PRIORITY

This application is a continuation of U.S. application Ser. No. 13/893,233, filed May 13, 2013, now U.S. Pat. No. 9,240,963, which is a continuation of U.S. application Ser. No. 11/019,537, filed Dec. 23, 2004, now U.S. Pat. No. 8,443,041, which claims the benefit of U.S. Provisional Application No. 60/584,477, filed Jul. 2, 2004. Each of the above applications is incorporated herein by reference in its entirety.

TECHNICAL FIELD

This invention relates to computer services with online chat systems.

BACKGROUND

On-line chat systems provide a way for on-line users to engage in real-time conversations. Typically, these systems provide for real-time group textual messaging, with the conversational groups defined by "chat rooms." Chat systems are normally implemented in a distributed computing environment.

Such chat rooms are beneficial because they enable real-time communications on various topics by two or more participants of similar or divergent interests or backgrounds. To find chat rooms with conversations of interest, chat participants typically infer conversation content based on the chat room title. For instance, a chat participant seeking to converse regarding football might select a chat room titled "Football."

SUMMARY

Generally, a method and system allows a user to view, in near real-time, current conversations in a chat room without becoming a participant in the chat room, so that the user can identify and join a chat room containing a conversation of interest to the user.

In one aspect, a method allows a user to view communications exchanged between other participants within an online chat room without the user becoming a participant within the online chat room. The online chat room enables ongoing exchanges of electronic communications between two or more participants whose participation within the chat room are mutually revealed to each other. A user is enabled to perceive the existence of the online chat room without the user becoming a participant within the online chat room. Selection of the online chat room by the user is received. Responsive to user selection of the online chat room and without the user becoming a participant within the online chat room, at least some of the communications exchanged between the participants within the online chat room are made perceivable to the user as the communications are exchanged.

Implementations of this aspect may include one or more of the following features. For example, the user's selection of the online chat room may include selection of a title of the chat room by the user, selection of a description of the chat room by the user, selection of a chat room category by the user, or selection of a web page, a portion of which enables perception of the chat room by the user. The name of the online chat room may be displayed to the user.

At least some of the communications may be made perceivable by accessing at least some of the communications, for example, all of the communications exchanged during a predetermined time period. At least a portion of the accessed communications may be stored and/or may be displayed. Displaying at least a portion of the accessed communications may include making the displayed communications appear live to the user. Making the displayed communications appear live may include displaying each displayed communication at a predetermined time interval, or may include associating each of the accessed communications with a time stamp and displaying each of the accessed communication at a time that corresponds to the time stamp.

Making at least some of the communications perceivable may further include limiting perception by the user of the ongoing communications, for example according to a predetermined length of time for the communications or according to a predetermined number of communications. At least some of the accessed communications may be filtered, such as by making one or more of the accessed communications unperceivable based on a word filter, for example a filter for obscenities.

An error check may be performed in response to the user selection of the chat room. The error check may include, for example, a determination as to whether, for example, the chat room is blocked by parental controls, the chat room is supported by a browser, or the chat room has a system error.

An option may enable the user to become a participant within the online chat room. Selection, by the user, of the option may be received, and responsively, the user may be enabled to become a participant within the online chat room. Enabling the user to become a participant may include, for example, identifying the user as a participant to other participants, enabling the user to create chat communications within the online chat room, or authenticating the user into the online chat room.

The user may be able to selectively pause and restart viewing the communications exchanged between the participants within the online chat room. The user may be able to review previously viewed communications exchanged between the participants within the online chat room.

In another aspect, a method allows a user to view communications exchanged between other participants within online chat rooms without the user becoming a participant within the online chat rooms. A base online chat room and one or more related online chat rooms that are additional instances of the base online chat room are provided. Each of the base online chat room and the related online chat rooms enables ongoing exchange of electronic communications between two or more participants. A user is able to perceive the existence of the base online chat room without the user becoming a participant within the base online chat room. Selection of the base online chat room by the user is received. A viewable chat room is selected from among the base chat room and the one or more related online chat rooms. Without the user becoming a participant within the viewable online chat room, at least some of the communications exchanged between the participants within the viewable online chat room are made perceivable to the user as the communications are exchanged.

Implementations of this aspect may include one or more of the following features. For example, selection of a viewable chat room may include randomly selecting from among the base chat room and the one or more related online chat rooms, or may include using an algorithm to select among the base chat room and the one or more related online chat rooms. A second viewable chat room may be selected after a predetermined time and at least some of the communications exchanged between the participants within the second viewable online chat room may be made perceivable to the user. An option may enable the user to become a participant within the base online chat room, the viewable online chat room, or one or more of the related online chat rooms.

In another aspect, a system allows a user to view communications exchanged between other participants within an online chat room without the user becoming a participant within the online chat room. The online chat room enables ongoing exchange of electronic communications between two or more participants whose participation within the chat room are mutually revealed to each other. A chat room module is configured to create and manage the online chat room. A client module is configured to receive selection of the online chat room by the user. A server module is configured to make perceivable to the user at least some of the communications exchanged between the participants within the online chat room as the communications are exchanged, responsive to user selection of the online chat room and without the user becoming a participant within the online chat room.

Implementations of this aspect may include one or more of the following features. The server module may be configured to access at least some of the communications exchanged between the other participants within the online chat room, store at least a portion of the accessed communications, and display at least a portion of the communications. Each of the communications may be displayed such that the displayed communications appear live to the user. The displayed communications may be made to appear live by displaying each displayed communication at a predetermined time interval, or by associating each of the accessed communications with a time stamp and displaying each of the accessed communication at a time that corresponds to the time stamp. The server module may be configured to limit perception by the user of the ongoing communications. The server module may be configured to filter the accessed communications. The server module may be configured to enable the user to become a participant within the online chat room.

In another aspect, a system allows a user to view communications exchanged between other participants within online chat rooms without the user becoming a participant within the online chat rooms. A chat room module is configured to create and manage a base online chat room and one or more related online chat rooms that are additional instances of the base online chat room. Each of the base online chat room and the related online chat rooms enables ongoing exchange of electronic communications between two or more participants. A client module is configured to receive selection of the base online chat room by the user. A server module is configured to select a viewable chat room from among the base chat room and the one or more related online chat rooms and, without the user becoming a participant within the viewable online chat room, to make perceivable to the user at least some of the communications exchanged between the participants within the viewable online chat room as the communications are exchanged.

Implementations of this aspect may include one or more of the following features. The viewable chat room may be selected randomly or may be selected using an algorithm. The server module may be configured to select a second viewable chat room after a predetermined time and to make perceivable to the user at least some of the communications exchanged between the participants within the second viewable online chat room as the communications are exchanged. The server module may be configured to enable the user to become a participant within one or more of the base online chat room, the viewable online chat room, and the related online chat rooms.

In another aspect, a user interface allows a user to view communications exchanged between other participants within online chat rooms. Each of the online chat rooms enables ongoing exchange of electronic communications between two or more participants. A window is configured to make perceivable to the user at least some of the communications exchanged between the participants within a selected one of the online chat rooms, without the user becoming a participant within the selected one of the online chat rooms as the communications are exchanged. A selectable item, upon selection by the user, is configured to enable the user to become a participant within the selected one of the online chat rooms.

The details of one or more implementations are set forth in the accompanying drawings and the description below. Other features will be apparent from the description and drawings, and from the claims.

DESCRIPTION OF DRAWINGS

FIGS. 8A-8D illustrate another user interface for viewing a chat room without participating in the chat room.

FIG. 9 illustrates examples of error messages that can be received while viewing a chat room without participating.

DETAILED DESCRIPTION

Typically, online chat communications involve an instantaneous or nearly instantaneous communication between two or more users, where each user is able to transmit, receive, and display communicated information. Additionally, chat communications may involve display and perception of online presence information regarding other users present in the chat room. Chat communications also may occur in the absence of online presence information. The chat communications may be machine-to-machine communications that occur without intervention by or communication through a chat server after a communication session is established or authentication is performed. Examples of chat communications service providers include AOL® (America Online, Inc.), Yahoo!®, and MSN®, among others.

Figure 1:
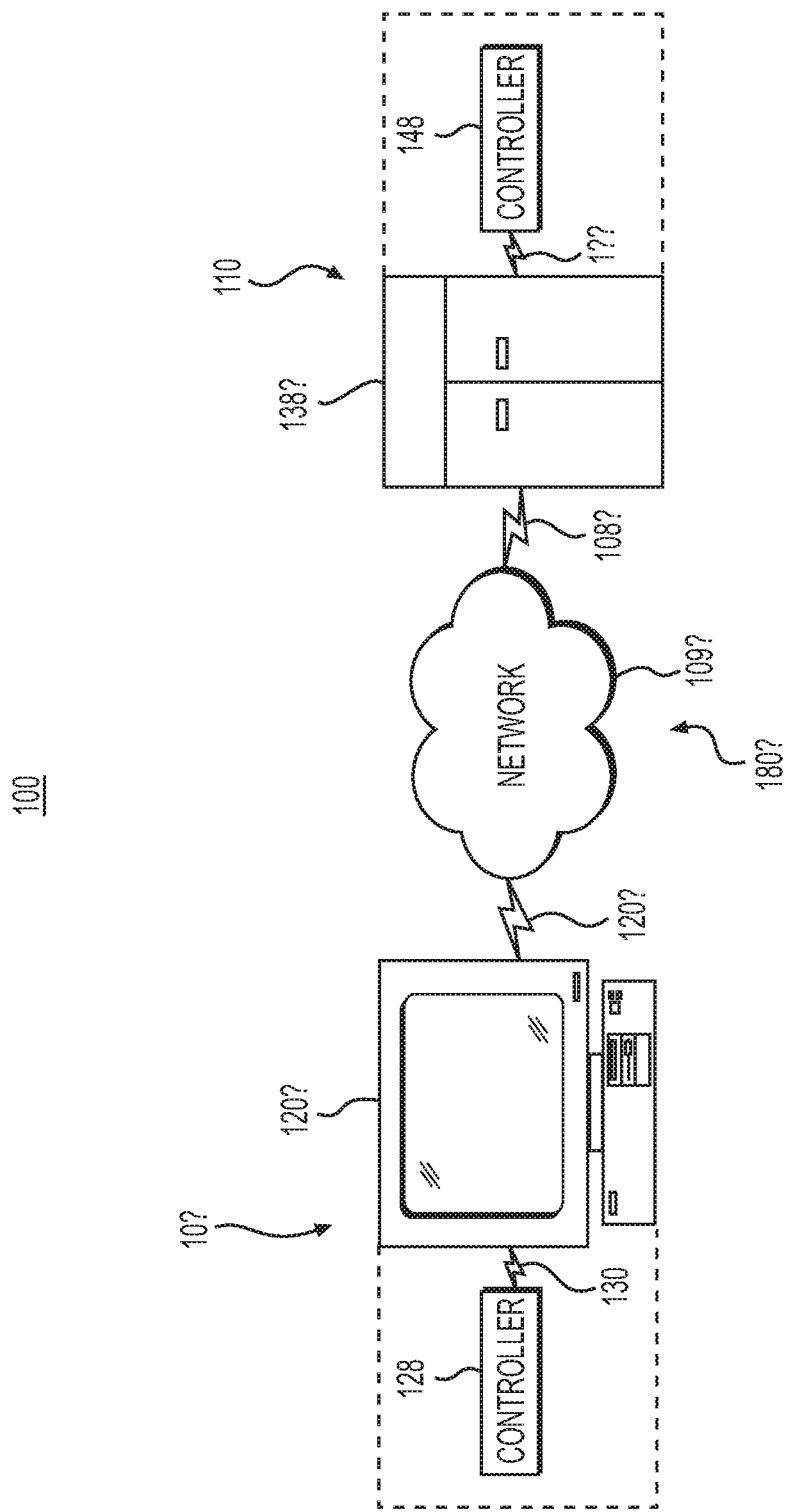
FIGS. 1-3 are block diagrams of exemplary communications systems.
Figure 2:
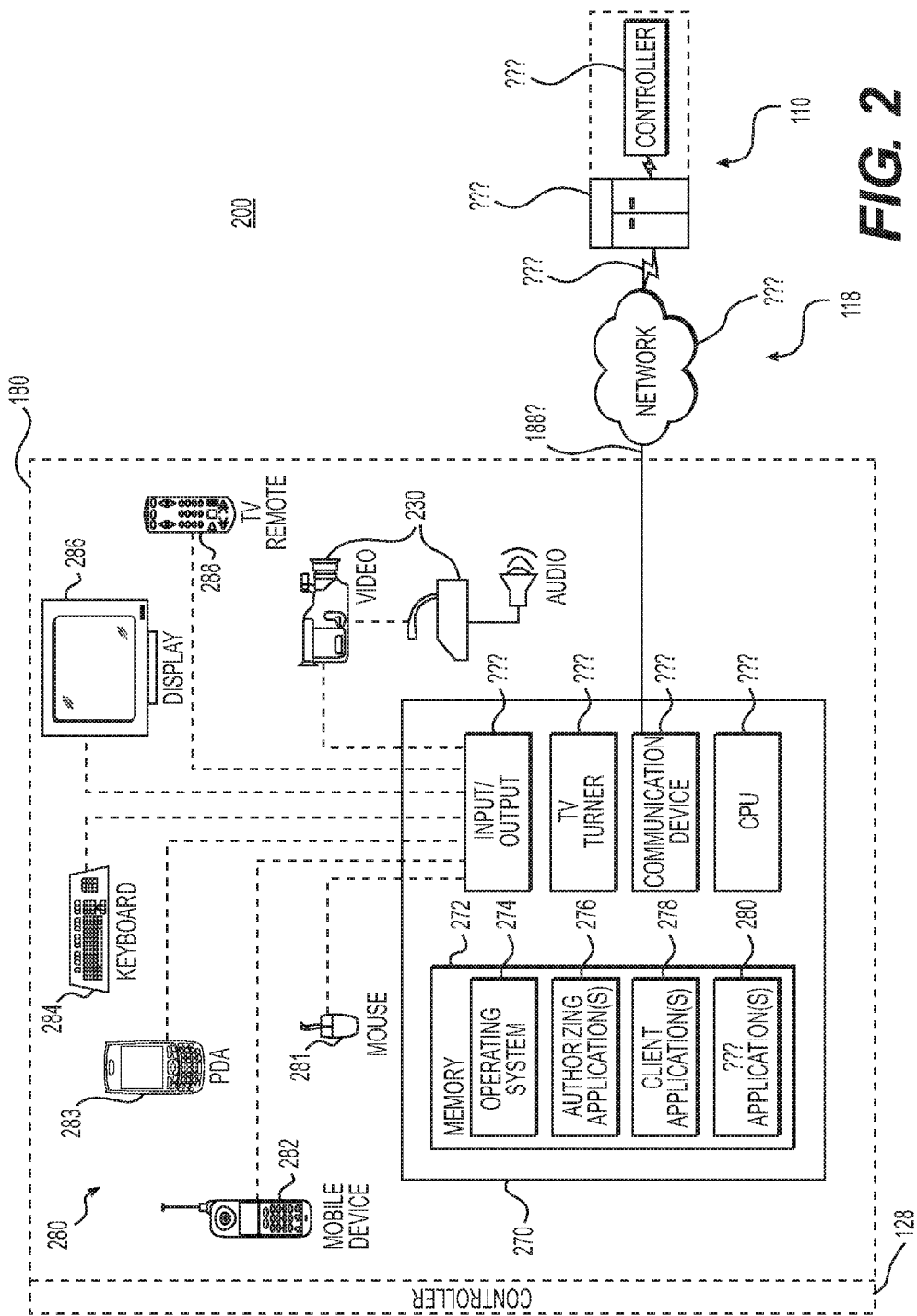

For illustrative purposes, FIGS. 1 and 2 show an example of a communications system for implementing an online chat. For brevity, several elements in the figures described below are represented as monolithic entities. However, as would be understood by one skilled in the art, these elements each may include numerous interconnected computers and components designed to perform a set of specified operations and/or may be dedicated to a particular geographic region.

Referring to FIG. 1, a communications system 100 is capable of delivering and exchanging data between a first chat participant system 105 and a host system 110 through a communications link 115. The first chat participant system 105 typically includes one or more client devices 120 and/or client controllers 125, and the host system 110 typically includes one or more host devices 135 and/or host controllers 140. For example, the first chat participant system 105 or the host system 110 may include one or more general-purpose computers (e.g., personal computers), one or more special-purpose computers (e.g., devices specifically programmed to communicate with each other and/or the first chat participant system 105 or the host system 110), or a combination of one or more general-purpose computers and one or more special-purpose computers. The first chat participant system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145 that are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the first chat participant system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a first chat participant system 105 communicating with a host system 110 through a communications link 115. The first chat participant system 105 includes a client device 120 that typically includes a general-purpose computer 270 having an internal or external memory 272 for storing data and programs such as an operating system 274 (e.g., DOS, Windows 98™, Windows 2000™, Windows Me™, Windows XP™, Windows NT™, OS/2, or Linux) and one or more application programs, Examples of application programs include authoring applications 276 (e.g., word processing programs, database programs, spreadsheet programs, or graphics programs) capable of generating documents or other electronic content; client applications 278 (e.g., America Online (AOL) client, CompuServe client, interactive television (ITV) client, Internet Service Provider (ISP) client, or chat client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270. The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the first chat participant system 105 may include one, some or all of the components and devices described above.

Figure 3:
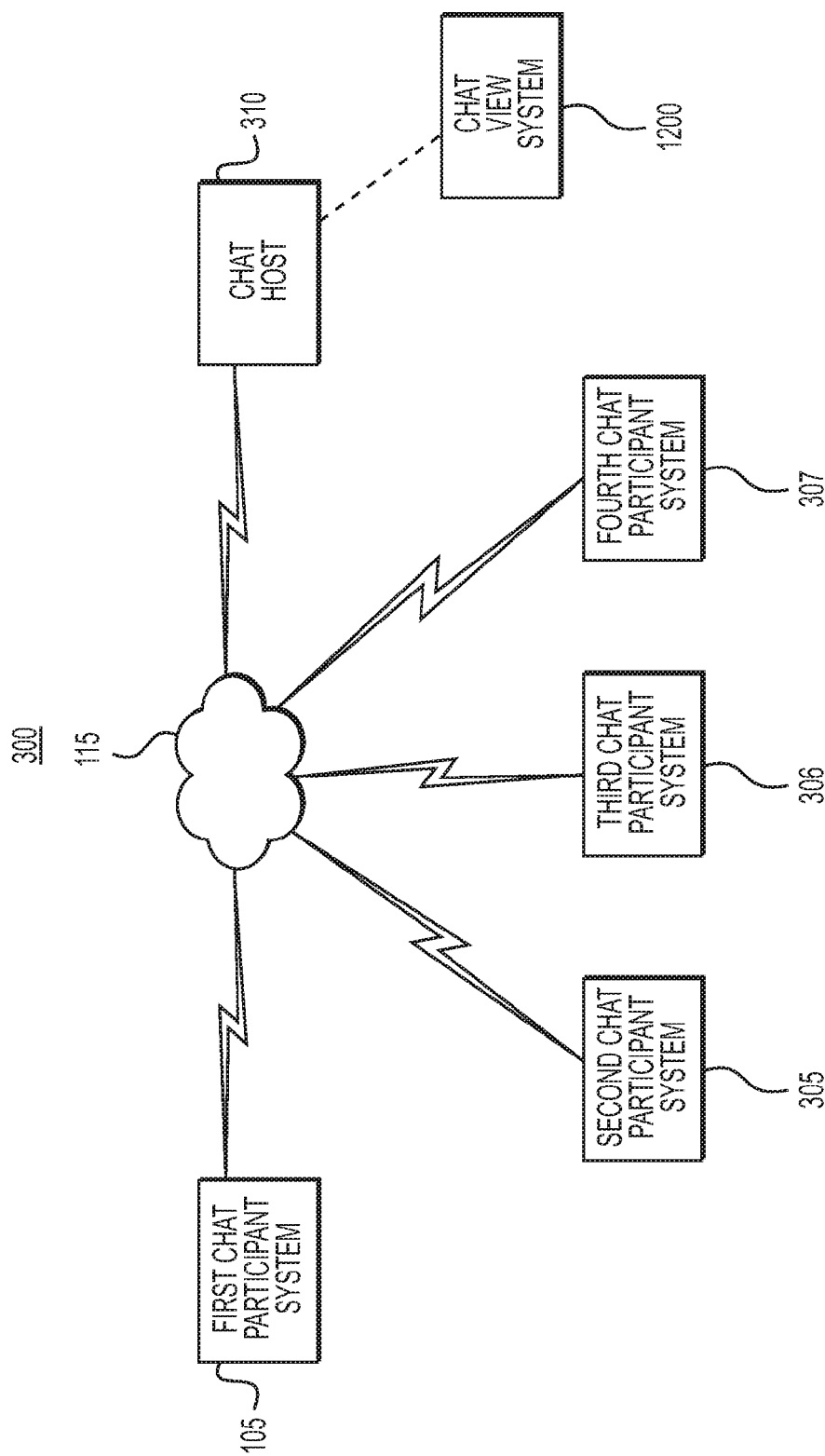

FIG. 3 illustrates a communications system 300 that supports a chat service including a first chat participant system 105 communicating with one or more other chat participant systems 305-307 and a chat host system 310 through a communication link 115. Chat host 310 also is coupled to a chat view system 1200, which is described in more detail below. Chat system users may be distributed geographically and may communicate with the chat host system 310 using chat participant systems such as second chat participant system 305, third chat participant system 306, or fourth chat participant system 307. The chat participant systems run chat client software that communicates with corresponding chat host software on chat host system 310, by way of a browser or otherwise. Chat host system 310 coordinates chat sessions by receiving the textual, or other, input sent from the first chat participant system 105 or the second chat participant system 305 and replicating that input to other systems such as the second chat participant system 305 or the third chat participant system 306, as appropriate.

In one implementation, the chat host system 310 may have characteristics similar to those described above with respect to the host system 110, the chat participant systems 305-307 may have characteristics similar to those described above with respect to the first chat participant system 105, and the chat participant systems 105 and 305-307 may include communication software to enable users of the client systems to access the chat host system 310.

The chat host system 310 may support chat services irrespective of a chat participant's network or Internet access. Thus, the chat host system 310 may allow users to send and receive messages, regardless of whether they have access to any particular ISP. The chat host system 310 also may support associated services, such as administrative matters, advertising, directory services, chat, and interest groups related to the chat. The chat host system 310 has an architecture that enables the devices (e.g., servers) within the chat host system 310 to communicate with each other. To transfer data, the chat host system 310 employs one or more standard or exclusive chat protocols.

To access the chat host system 310 to begin a chat session in the implementation of FIG. 3, the first chat participant system 105 establishes a connection to the chat host system 310. Once a connection to the chat host system 310 has been established, the first chat participant system 105 may directly or indirectly transmit data to and access content from the chat host system 310. By accessing the chat host 310, a first chat participant can leverage the chat client application to determine whether particular users ("buddies" or potential second chat participants) are online, exchange messages with particular buddies, participate in group chat rooms, trade files such as pictures, invitations or documents, find other buddies with similar interests, get customized news and stock quotes, and search the Web. For example a first chat participant who is using first chat participant system 105 may view whether a buddy using second chat participant system 305 is online, and if so, may exchange messages with that buddy. Chat participant systems 305-307 may be similarly manipulated to establish contemporaneous connections with chat host system 310.

If the second chat participant is online, the first chat participant may exchange messages with the second chat participant. In one implementation, the messages sent between the first chat participant system 105 and the second chat participant system 305 are routed through the chat host system 310. In another implementation, the messages sent between the first chat participant system 105 and the second chat participant system 305 are routed through a third party server (not shown), and, in some cases, are also routed through the chat host system 310. In yet another implementation, the messages are sent directly between the first chat participant system 105 and the second chat participant system 305.

In one implementation, the chat host system 310 also includes a chat user profile server (not shown) connected to a database (not shown) for storing user profile data. The user profile server may be used to enter, retrieve, edit, manipulate, or otherwise process user profile data. In one implementation, a chat participant's profile data includes, for example, the chat participant's screen name, instant messaging buddy list, identified interests, and geographic location. The chat participant's profile may also include personalization items selected by the first chat participant. The chat participant may enter, edit and/or delete profile data using an installed chat client application on the chat participant system 105, 305, 306, or 307 to interact with the user profile server.

Because the chat participant's data is stored in the chat host system 310, the chat participant does not have to reenter or update such information in the event that the chat participant accesses the chat host system 310 using a new or different chat participant system. Accordingly, when a chat participant accesses the chat host system 310, the chat server can instruct the user profile server to retrieve the chat participant's profile data from the database and to provide profile data to the chat server. Alternatively, user profile data may be saved locally on the chat participant system.

In a particular implementation, chat host 310 supports multiple chat rooms on multiple topics. For example, chat host 310 may support one or more chat rooms related to, for example, movies, baseball, or cooking. In addition, chat host 310 may allow for replication of a base chat room to multiple instances when the base chat room becomes full of participants. For example, a base chat room named Baseball may be limited to 15 participants. If more than 15 participants wish to participate in this chat, the host 310 may replicate the Baseball chat room to Baseball2 to accommodate the additional participants. This can be done as many times as needed to accommodate all of the interested participants. Chat host 310 also may allow users to create their own chat rooms on customized topics and to invite other users to joint the chat. The customized chat rooms may be private, semi-private, or public. A chat room also may be moderated by a moderator. In addition, chat host 310 may automatically create new chat rooms and invite users to join based on interests expressed by a user. Each chat room is associated, for example, with a chat room name, a chat room description, a URL, and chat room properties (e.g., maximum number of users, private or public, moderated or not).

Figure 4:
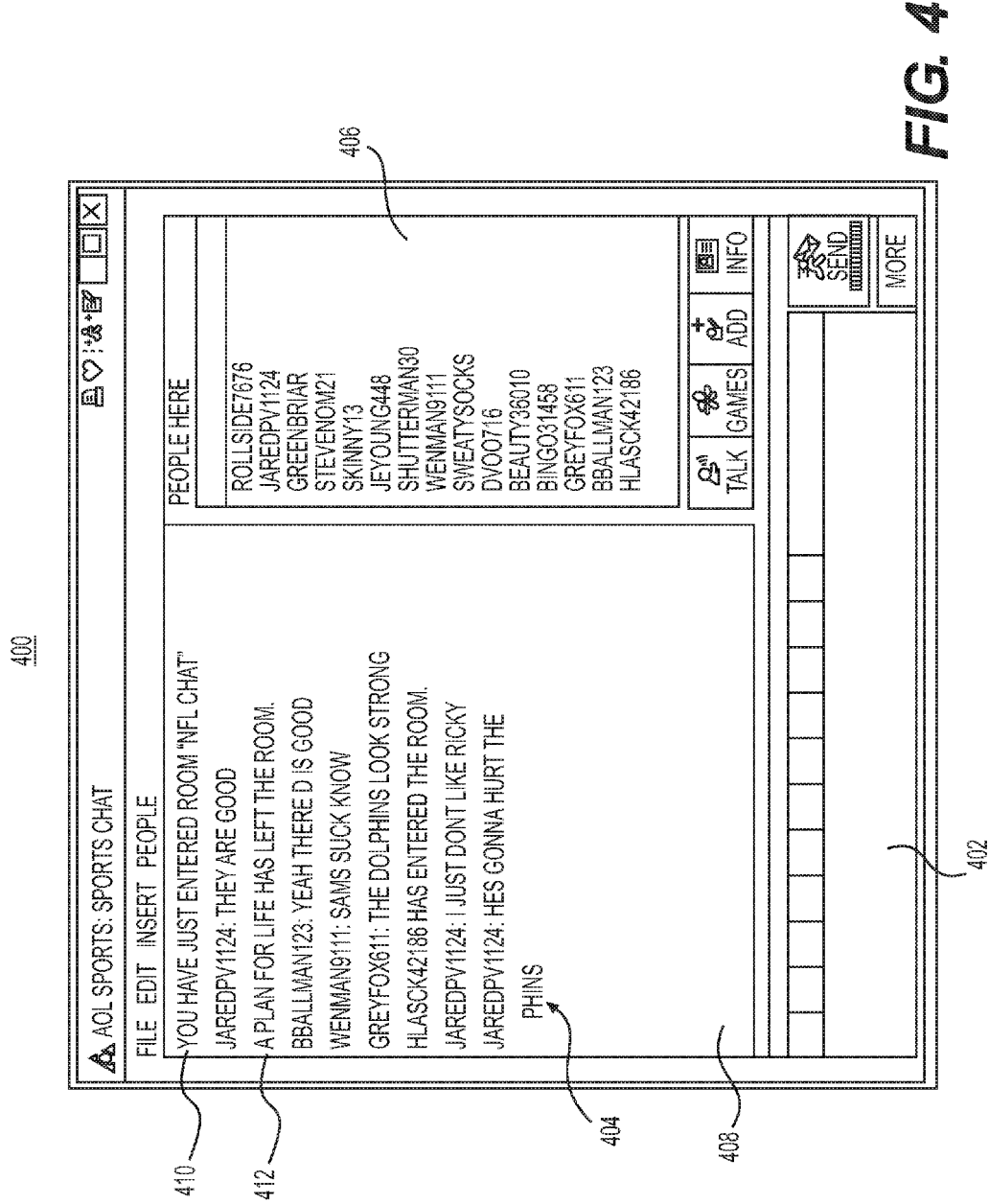
FIG. 4 illustrates a screen-shot of a typical chat room user interface, as it would appear on a participant system.

FIG. 4 illustrates a screen-shot of a user interface for a typical chat room, as it would appear on a client system 105 of a participant in the chat room. The exemplary chat room of FIG. 4 has 16 participants whose screen names are listed in window 406. Their conversation 404 is displayed in scrolling window 408, which normally appears the same for all participants. A participant may converse with other participants by typing a line of text in edit box 402 and activating a send command, for example, by pressing the ENTER key on the keyboard of the participant's client system 105. In response, the entered text is displayed at the bottom of window 408 so that all participants in the chat room can see the entered text. As shown at 410 and 412, the conversation 404 indicates when one of the participants enters or leaves the chat room, respectively.

Figure 5:
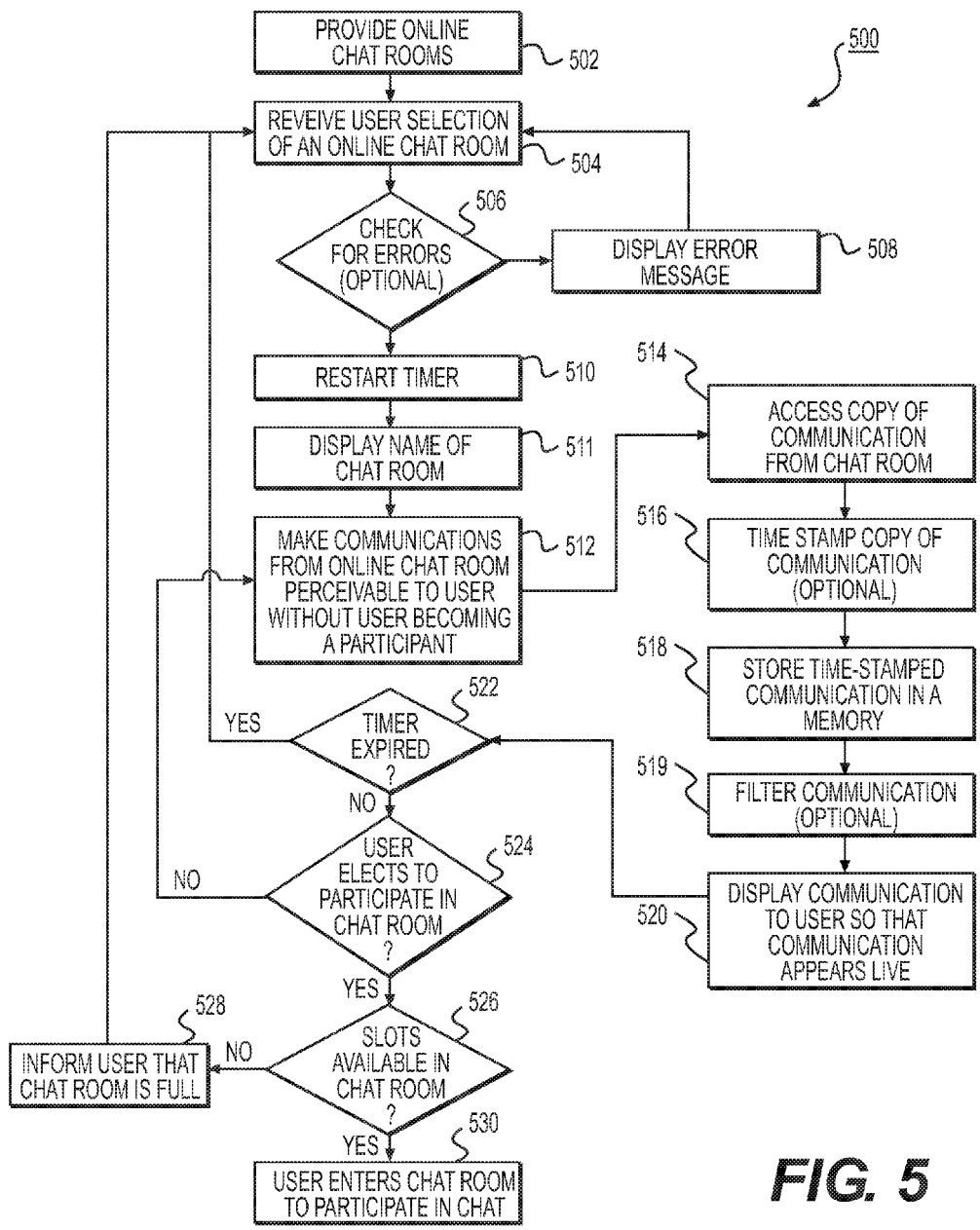
FIG. 5 is a flow chart illustrating an exemplary method of viewing a chat room without participating in the chat room.
Figure 6:
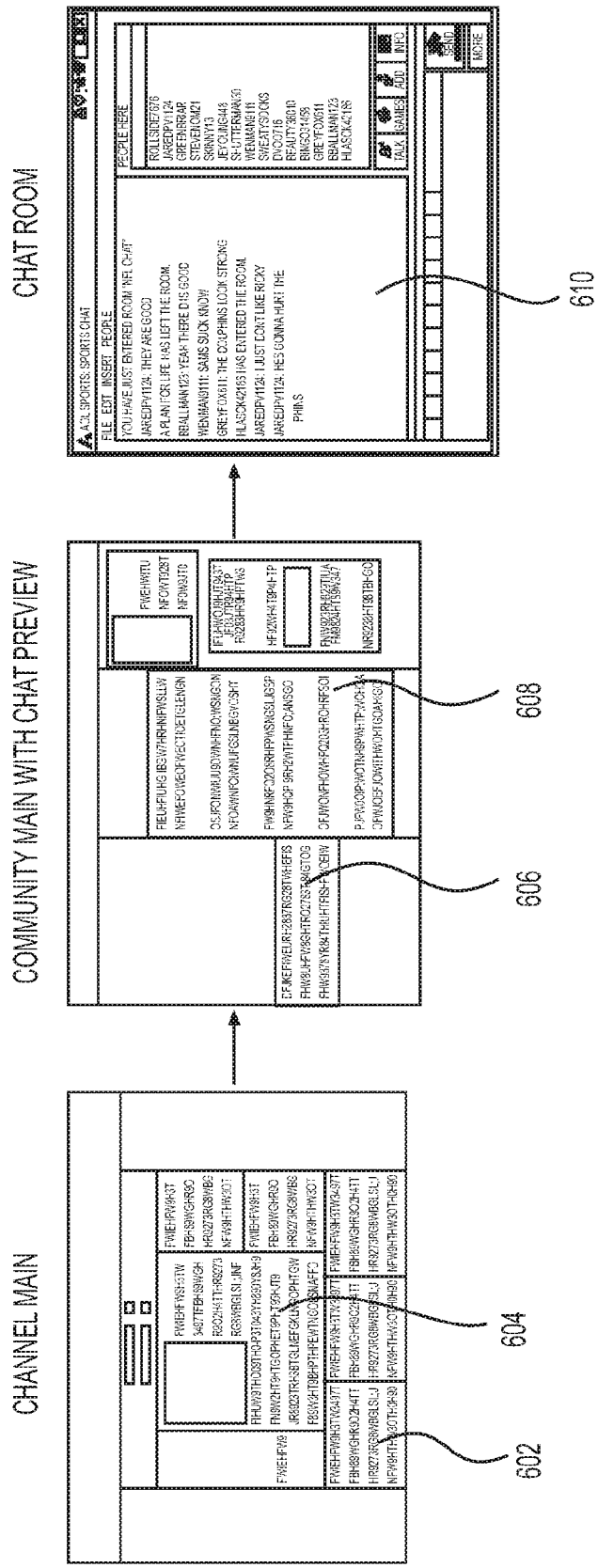
FIG. 6 illustrates a user interface for selecting a chat room to view.

FIG. 5 illustrates a flow chart of one implementation of a method 500 for viewing a chat room without participating in the chat room. Initially, one or more online chat rooms having various names and topics are provided (502) and a user's selection of a chat room is received (504). This may be accomplished in one or more of a variety of ways. For example, the user may select a chat room from a list of chat room titles, chat room descriptions, or chat room categories. In another implementation, the user may select a link in a web page or a channel that links to a URL for the chat room. For example, FIG. 6 illustrates a user interface whereby the user navigates to a Main Channel web page 602 and selects a link 604 that links the user to News & Politics Talk web page 606. In the News & Politics Talk web page 606, the user selects one of several links 608 to link to one chat room 610 in the category of news and politics.

Figure 7A:
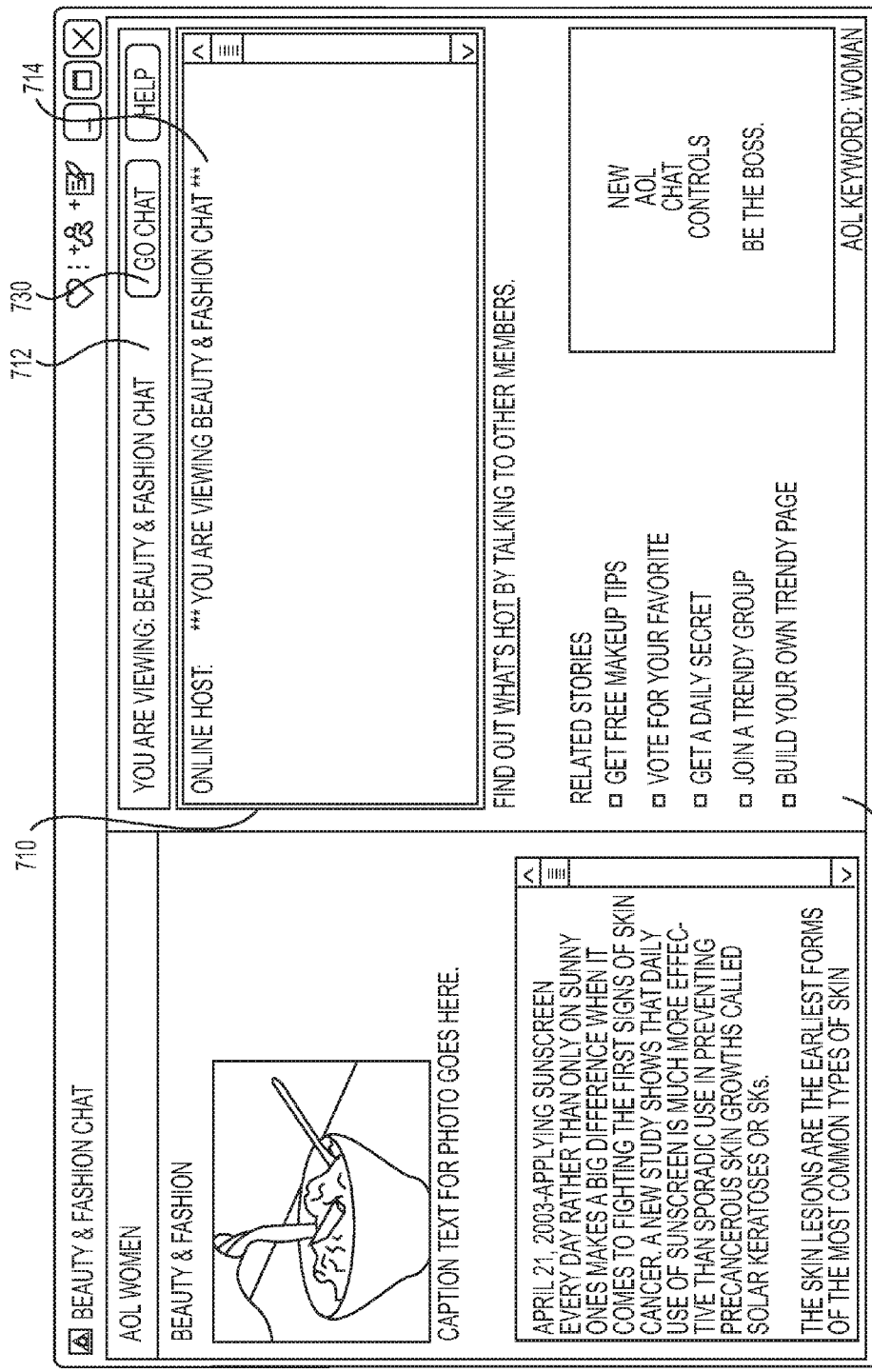
FIGS. 7A-7D illustrate a user interface for viewing a chat room without participating in the chat room.
Figure 8A:
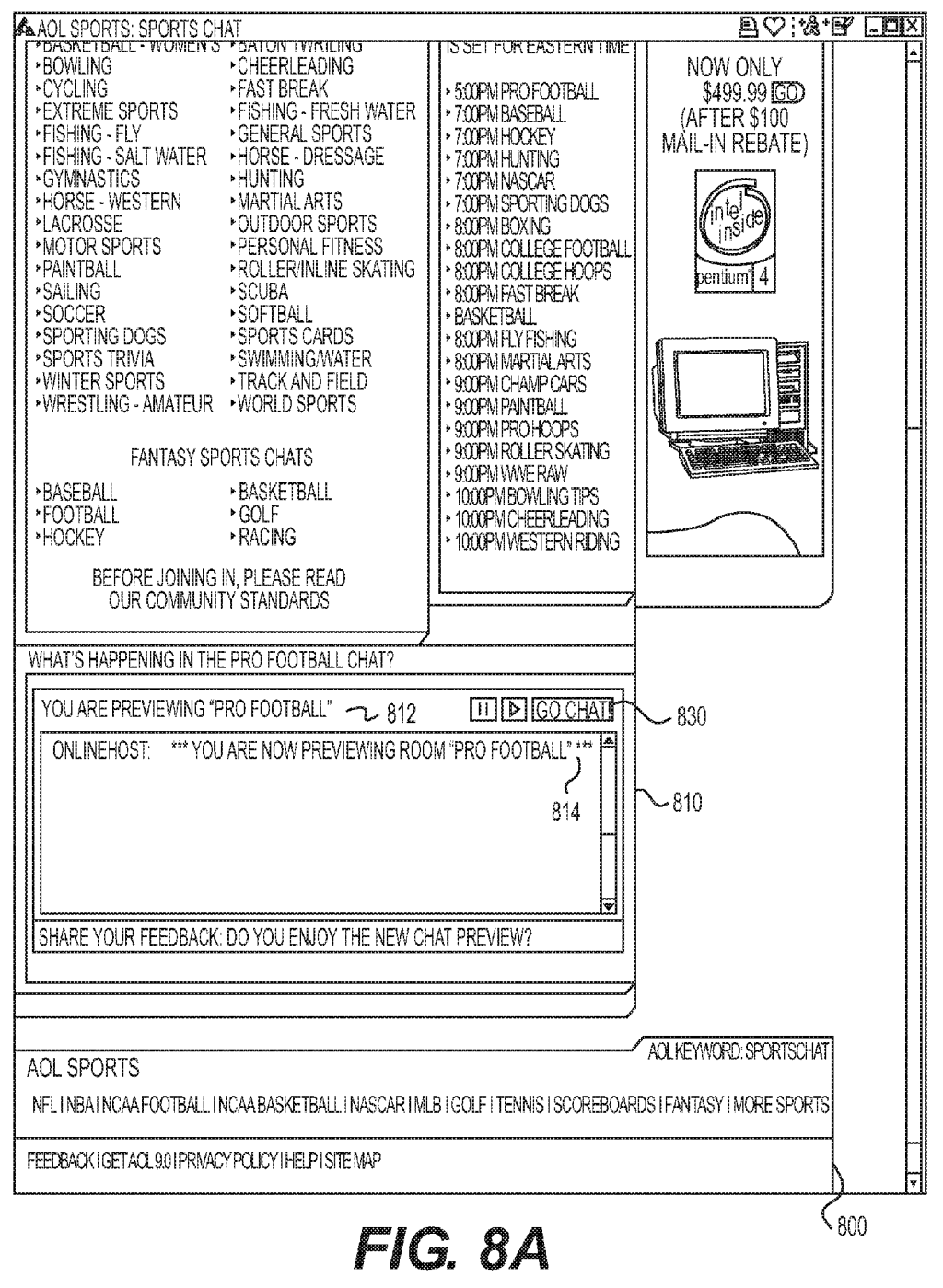
Figure 8B:
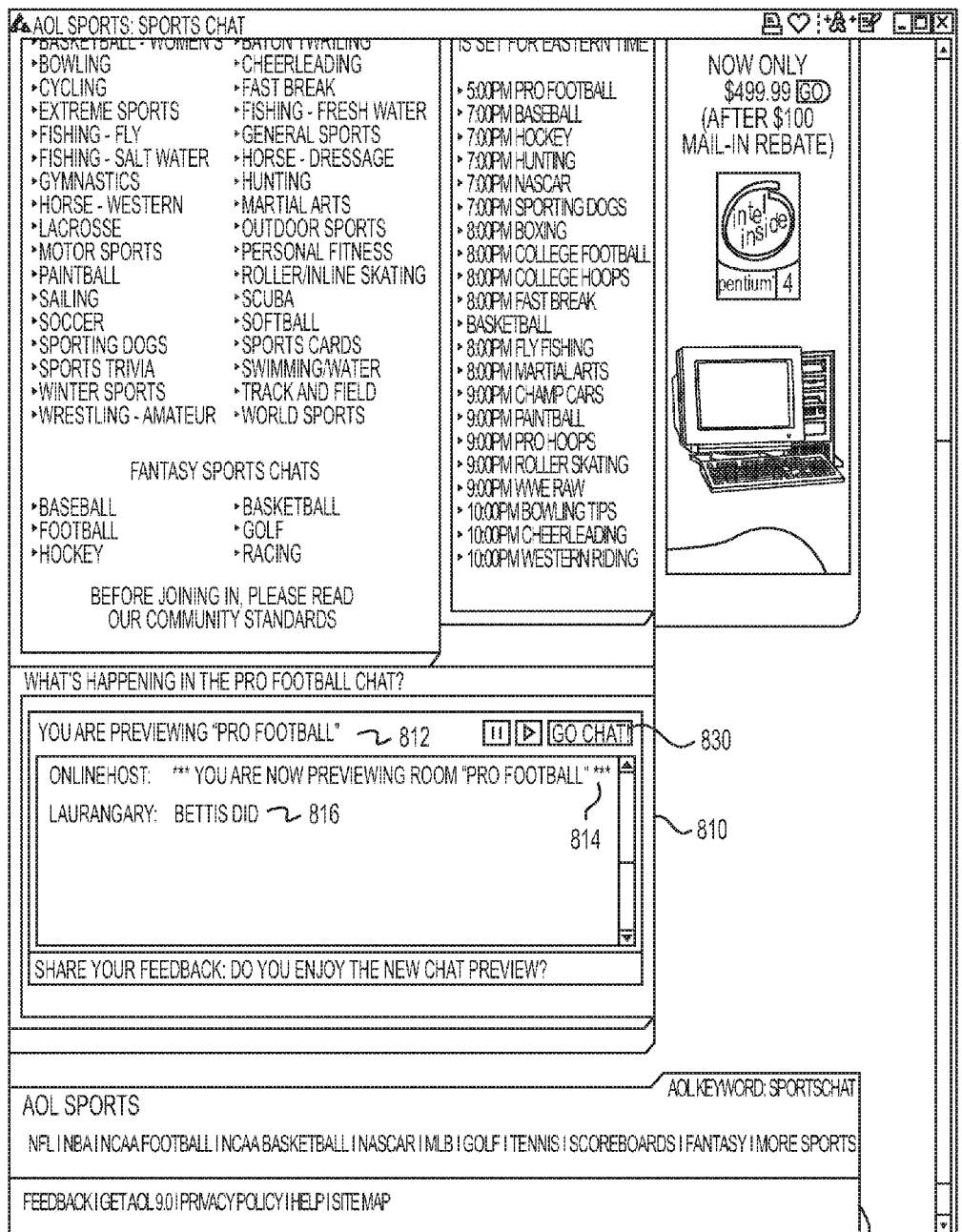
Figure 8C:
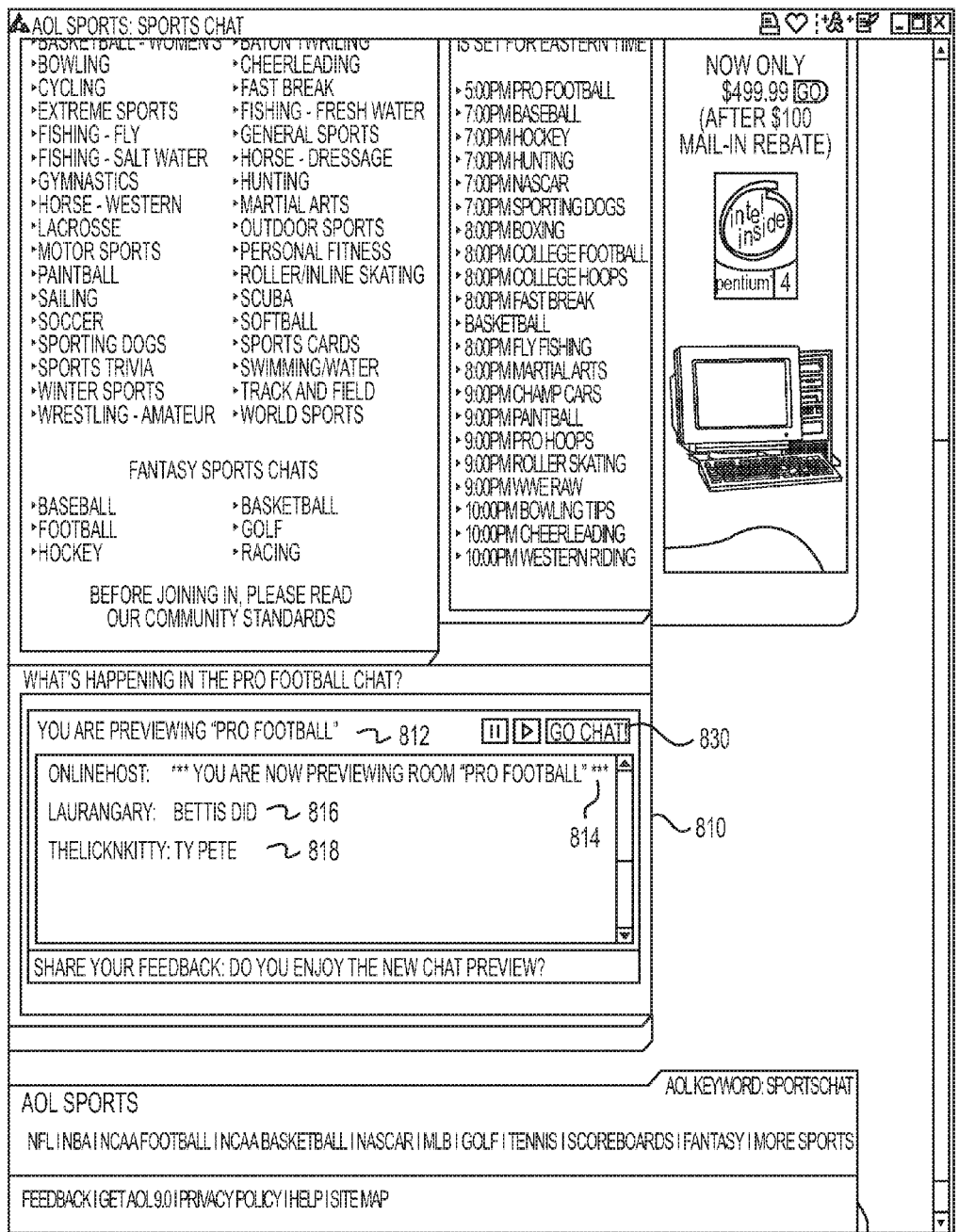
Figure 8D:
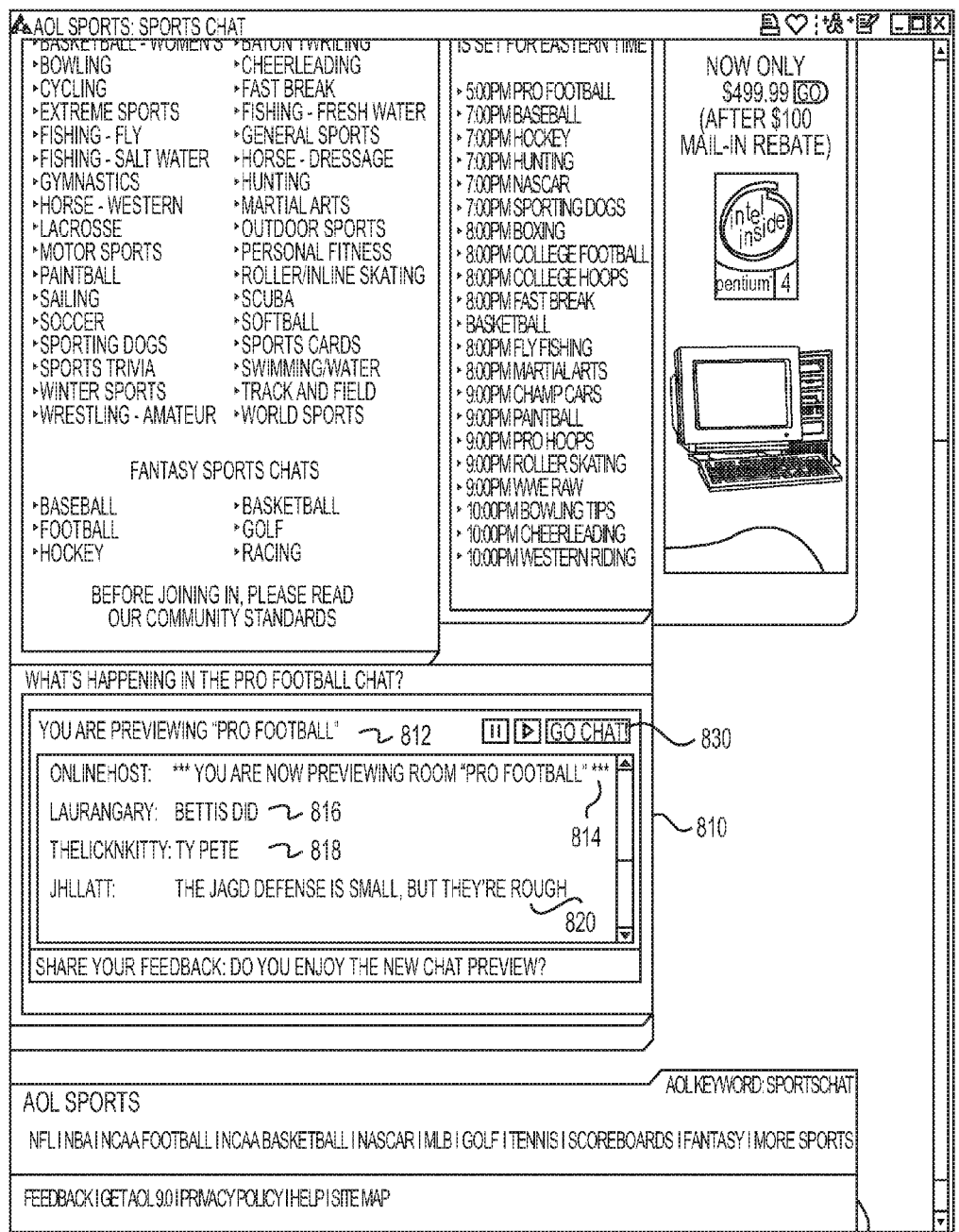

In another implementation, the user may select a chat room by selecting a web page or a channel that includes an embedded chat room view window. For example, FIG. 7A illustrates a user interface whereby the user navigates to a Beauty & Fashion channel web page 700, which has an embedded Beauty & Fashion chat view window 710. FIG. 8A illustrates another user interface showing a Sports channel web page 800 with an embedded chat view window 810 for a "Pro Football" chat room.

Referring again to FIG. 5, after receiving a chat room selection, an optional check is made for errors with respect to the selected chat room (506). The error check can check for a number of possible errors, such as whether there is a system error, whether the browser cannot support the chat view, and whether the chat room is blocked by parental controls, such as due to mature content. If there is an error, then, an error message is displayed to the user (508).

FIG. 9 provides a chart that shows examples of error messages to be displayed for various errors. Each error includes two messages, one for when the user is not using the client and another for when the user is using the client. For example, if the user is not using the client and the chat room is blocked by parental controls block, the error message will be "Sorry! Your screen name has been blocked from viewing this chat room. For more information visit AOL Parental Controls." The text AOL Parental Controls includes a hyperlink to the parental controls controller at http://www.aol.com/product/parcon.adp. If the user does not select one of the hyperlinks in the error message, the method loops back to allow the user to select another chat room (504).

If there is no error, then a timer, such as a 30 second timer, is restarted (510). The timer corresponds to the length of time that a user is able to view a given chat room. Next, the name of the chat room being viewed is indicated to the user (511). For example, in FIG. 7A, user interface 700 includes a chat view window 710 that includes a header 712 that indicates that the name of the chat room is "Beauty & Fashion Chat." In addition, an initial communication 714 from the Online Host in the chat view window 710 indicates the name of the chat room. Similarly, in FIG. 8A, user interface 800 includes a chat view window 810 that includes a header 812 and a communication from the online host 814, each of which provides the name of the chat room being viewed.

Figure 7B:
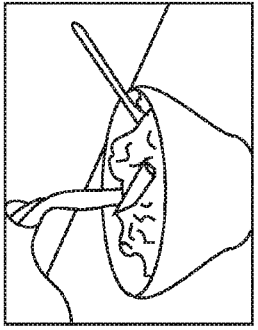
Figure 7C:
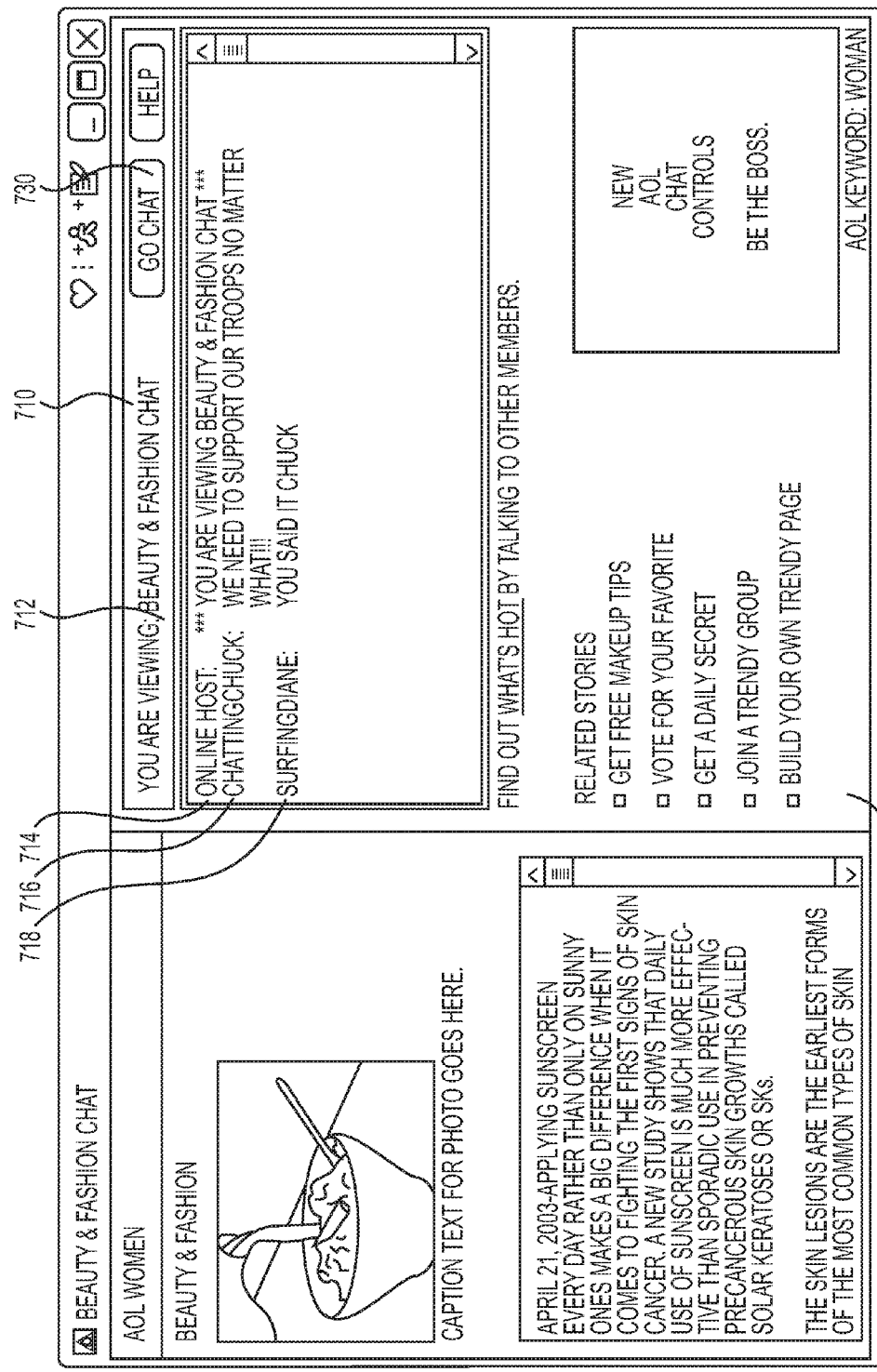
Figure 7D:
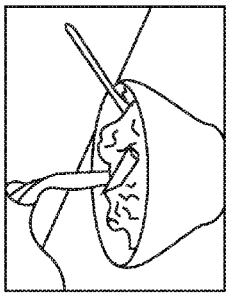

Next, the communications from an online chat room are made perceivable to a user without the user becoming a participant in the chat room (512). As shown, making the communications perceivable includes accessing a communication from a chat room participant (514). For example, a copy of a communication "We need to support our troops no matter what," communicated by a chat room participant with the screen name "Chatting Chuck," is accessed. Next, the copy of the text optionally is time-stamped, such as by being associating the copy with the time and date that the communication was input by Chatting Chuck (516). The copied text and the optional time stamp then are stored, for example, in a memory, such as a buffer (518). The stored communication optionally may be filtered, such as by being checked for obscenities (519). If the communication contains obscenities, the obscenities may be redacted or the entire communication may be deleted. The communication is then displayed to the user, such that the communication appears to be live (520). For example, the communication may be displayed to the user at a predetermined interval after the time of the optional time stamp associated with the communication. Alternatively, the communication may be displayed to the user at a predetermined time interval after a previous communication is displayed to the user. In yet another implementation, several communications are displayed to the user all at once. For example, as shown in FIG. 7B, the communication from Chatting Chuck is displayed to the user at line 716 in chat preview window 710.

Accessing, optionally time-stamping, storing, optionally filtering, and displaying the communications shortly after they have been input by a participant continue until the timer expires (522) or until the user elects to participate in the chat room (524). Thus, additional communications are displayed to the user such that the communications appear live to the user. For example, as shown in FIGS. 7A-7D, communications 714, 716, 718, 720, and 722 are displayed to the user so that they appear to be live. Similarly, in FIGS. 8A-8D, communications 814, 816, 818, and 820 are displayed to the user so that they appear to be live.

A determination is made as to whether the timer has expired (522). If the timer has expired, the method loops back to allow the user to select another chat room to view (504). If the timer has not expired, a determination is made as to whether the user wishes to enter the chat room to participate in the chat (524). For example, the user interface 700 shown in FIGS. 7A to 7D and the user interface 800 shown in FIGS. 8A to 8D includes "Go Chat" buttons 730 and 830, respectively, that allow the user to enter the chat room that is being viewed. If the user wishes to enter the chat, a determination is made as to whether there are slots available in the chat room (526). If the chat room is full, then the user is informed, such as by a pop-up window, that the chat is full and is asked to select a different chat room (528). The method then loops back to allow the user to select another chat room (504). If there is space available in the chat room, then the user is allowed to enter the chat room (530). In this case, the user is authenticated into the chat room, identified as a participant to the other participants, and enabled to create chat communications within the chat room, for example, through a user interface such as the one shown in FIG. 4.

Figure 10:
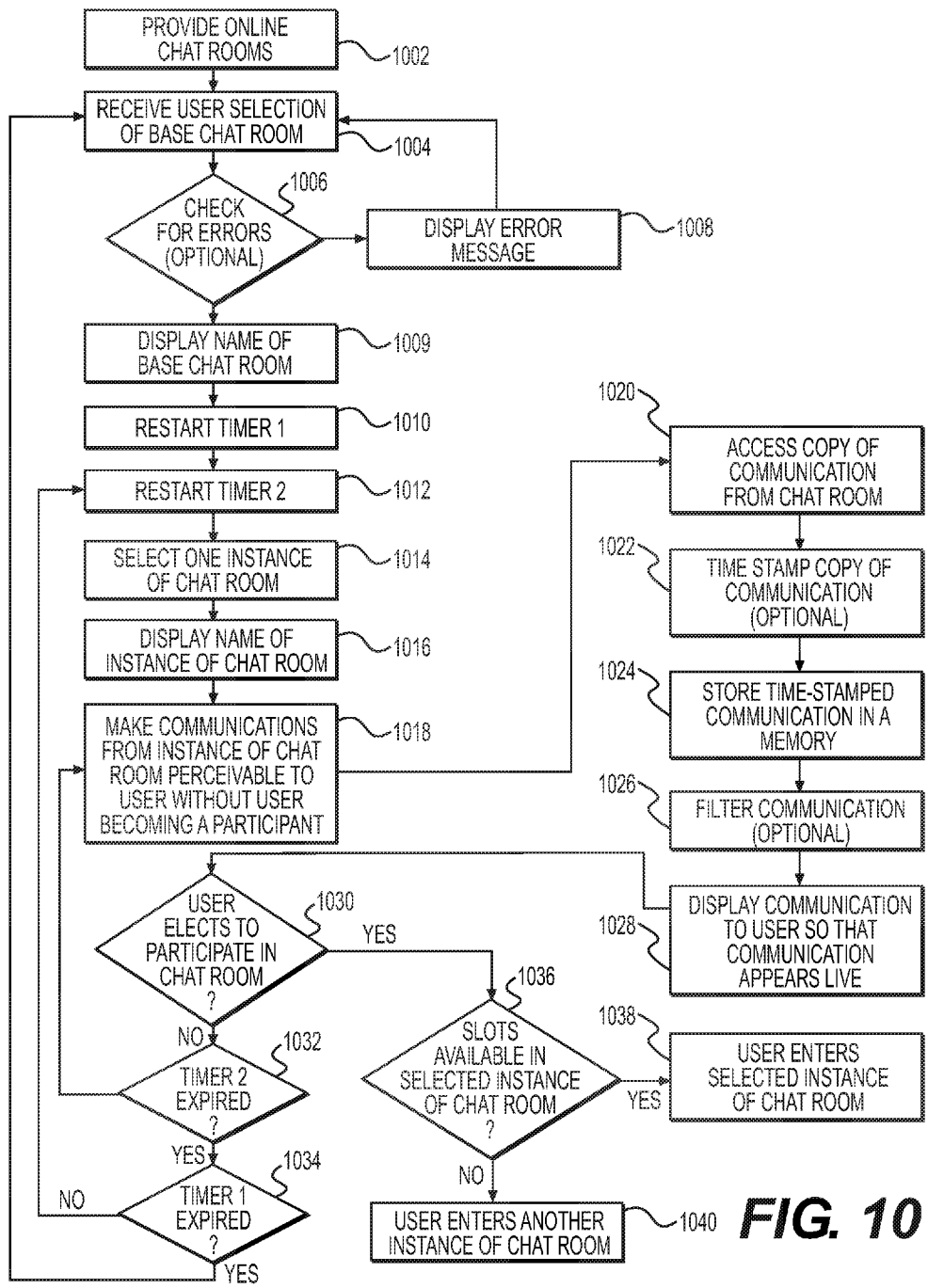
FIG. 10 is a flow chart illustrating another exemplary method of viewing a chat room without participating in the chat room.

FIG. 10 illustrates a flow chart of another implementation of a chat view method 1000 for enabling a user to view communications exchanged by other participants of a chat room prior to the user becoming a participant in the chat room. Method 1000 differs from method 500 in that it allows the user to view a base chat room that has been replicated into more than one additional instances to accommodate more participants than could fit into a single instance of the chat room. For example, there may be multiple instances of the base chat room Baseball, named Baseball1, Baseball2, and Baseball3. Method 1000 allows the user to view each instance of the base chat room, without participating in the chat rooms.

Figure 11A:
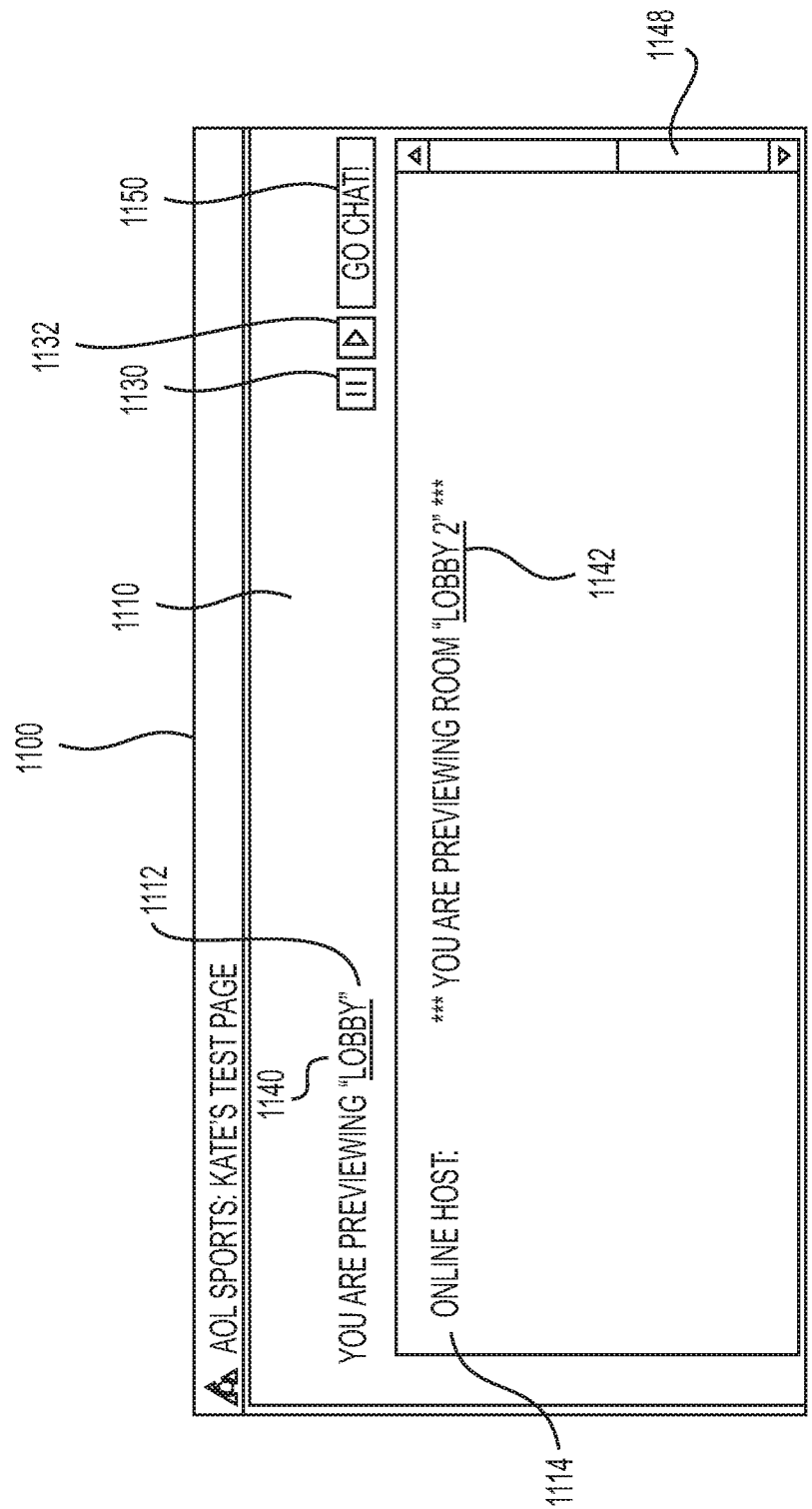
FIGS. 11A-11E illustrate another user interface for viewing a chat room without participating in the chat room.

Initially, the system provides one or more base online chat rooms, at least one of which has multiple instances (1002). A user's selection of one of the base chat rooms that has multiple instances then is received (1004). This may be accomplished in one or more of the ways described above with respect to method 500. For example, FIG. 11A shows an exemplary user interface 1100 containing a chat view window 1110, in which the user has selected the Chat Room named "Lobby" within a Sports channel website.

Next, an optional error check is made as to whether the chat room can be displayed (1006). If there is an error, then an error message is displayed to the user (1008) and the method loops back to allow the user to select another chat room (1004). If there is no error, the name of the base chat room being viewed is displayed to the user (1009). For example, in FIG. 11A, chat view window 1110 includes a header 1112 that states "You are previewing. 'Lobby.'"

Next, a first timer (Timer 1), such as a 5 minute timer, is restarted (1010). The first timer corresponds to the amount of time that a user is allowed to view all of the instances of the selected base chat room. A second timer (Timer 2), such as a 30 second timer, also is restarted (1012). The second timer has a length less than the first timer and corresponds to the amount of time that a user is permitted to view each instance of a selected base chat room.

Once the timers are restarted, an instance of the base chat room is selected for viewing (1014). This selection may be done, for example, randomly or by using an algorithm that selects the instance of the base chat room that has the most recent communications. The name of the selected instance of the chat room is then displayed to the user (1016). For example, in FIG. 11A, in a line 1114 in window 1110, the online host states "You are viewing room 'Lobby 2.'"

The communications from an online chat room then are made perceivable to a user without the user becoming a participant in the chat room (1018). This includes accessing a copy of a communication from a chat room participant (1020). For example, a copy of the communication "any hot girl out here warm talk 2 a hot 16/m/m im me or hit 455," communicated by a chat room participant with the screen name "Thugattd16," is accessed. Next, the copy of the communication is optionally time-stamped (1022), such as by associating the copy with the time and date that the message was communicated. The copied text and the optional time stamp are stored in a memory such as, for example, a buffer (1024). The stored communication optionally may be filtered (1026), such as by being checked for obscenities by comparing the communication to a list of known obscenities. If the communication contains obscenities, the obscenities are redacted or the entire communication is deleted. The communication then is displayed to the user, such that the communication appears to be live (1028). For example, the communication may be displayed to the user at a predetermined interval after the time of the optional time stamp associated with the communication. Alternatively, the communication may be displayed to the user at a predetermined time interval after a previous communication is displayed to the user. In yet another implementation, several communications are displayed to the user all at once. For example, a shown in FIG. 11B, the communication from Thugattd16 is displayed to the user at line 1116.

Accessing, optionally time-stamping, storing, optionally filtering, and displaying communications shortly after they have been inputted by a participant continue until the second timer expires (1032) or until the user elects to participate in the chat room (1030). Thus, additional communications are displayed to the user, such that it appears to the user that the chat is being viewed "live." For example, as shown in FIGS. 11A-11C, communications 1114, 1116, 1118, 1120, and 1122 are displayed to the user so that they appear to be live.

Figure 11B:
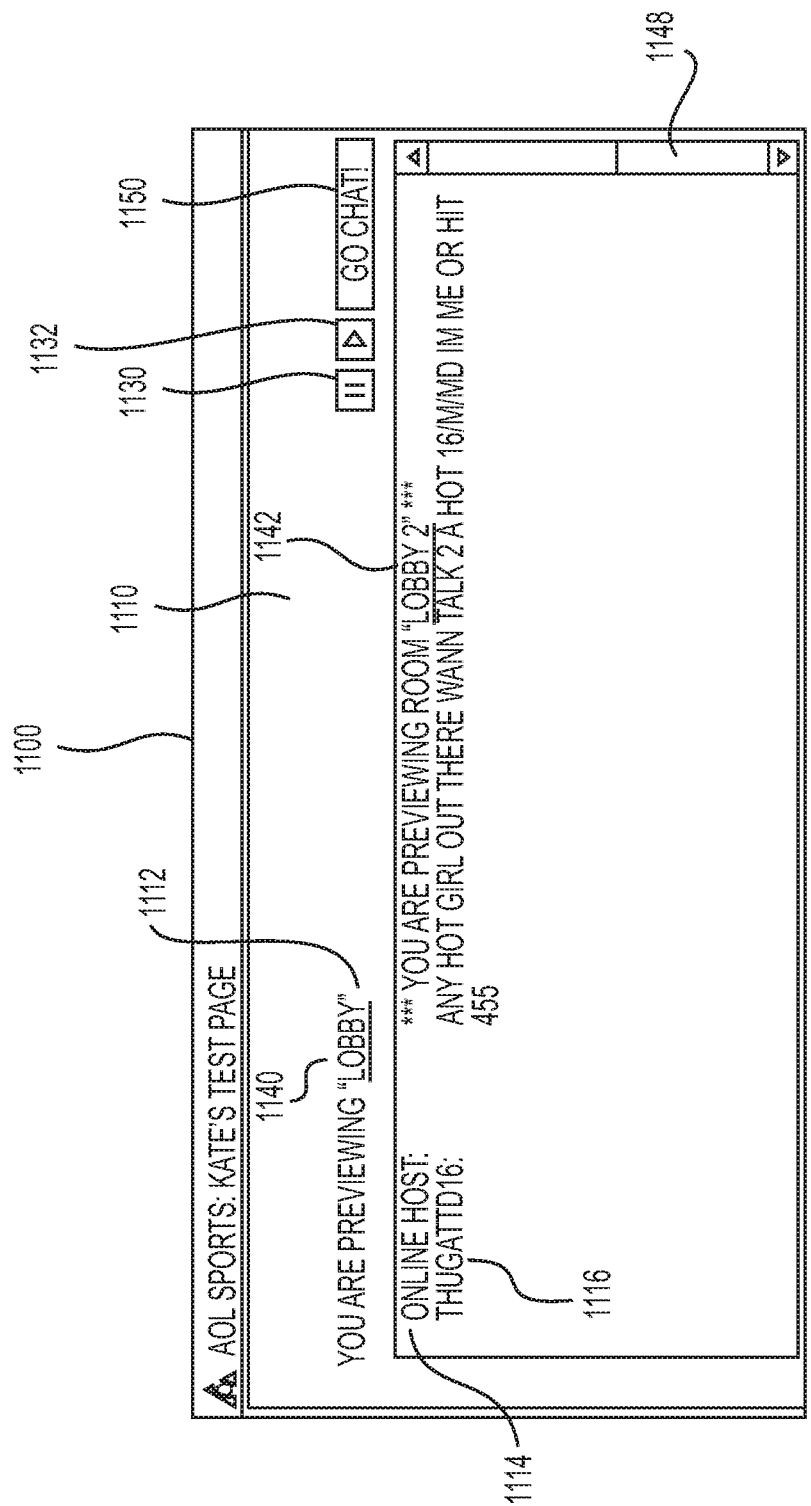
Figure 11C:
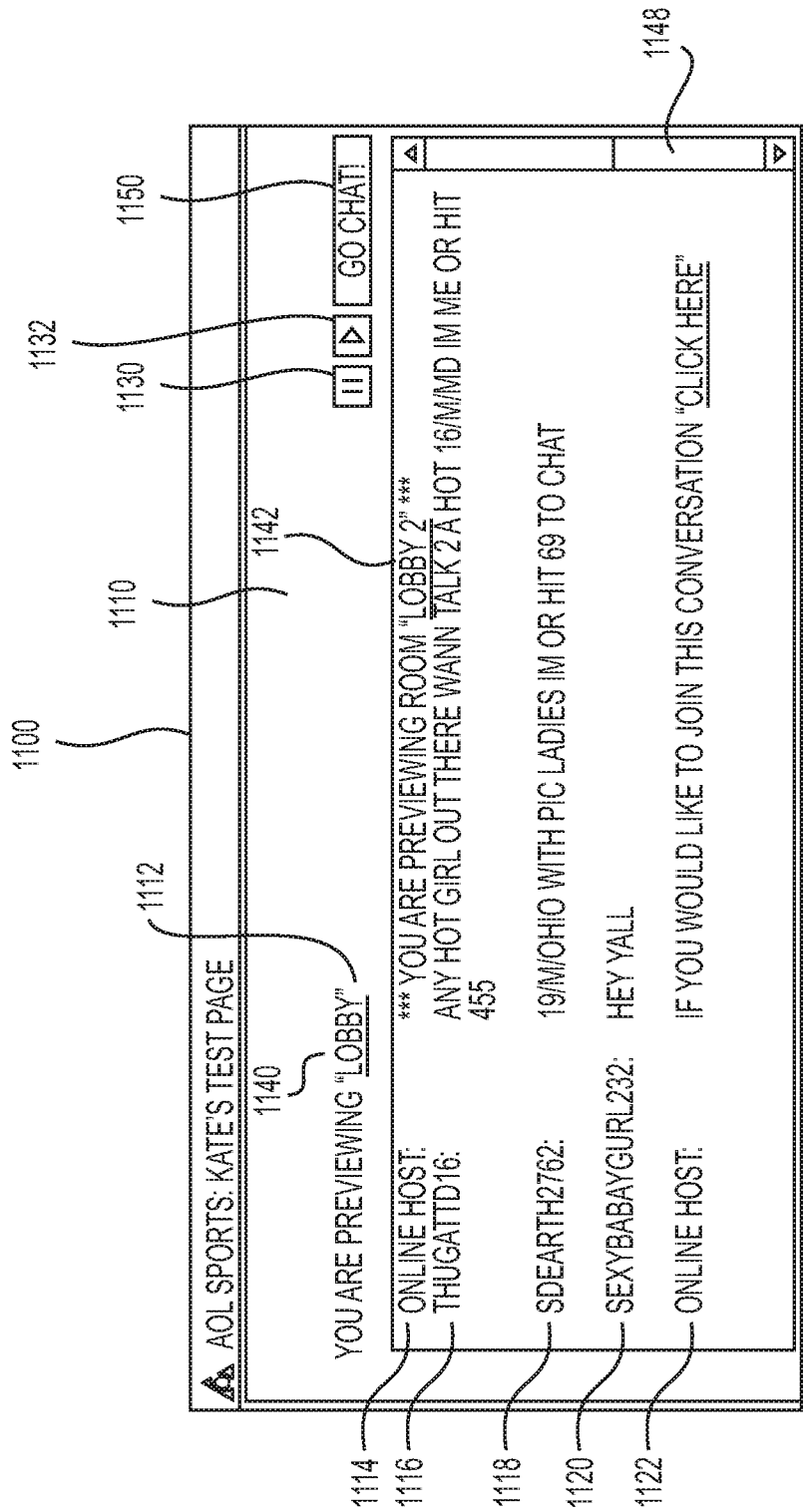

As shown in FIGS. 11A-11C, the user interface 1100 includes a pause button 1130 and a play button 1132. Selecting the pause button 1130 pauses the user's view of the chat and stops additional communications from being displayed to the user. Selecting the play button 1132 will resume the user's view of the chat at the time that the user restarts the playing of the chat, skipping any intervening communications between the time the chat was paused and the time the chat was restarted.

Next, a determination is made as to whether a user elects to participate in one instance of the chat room (1030). If the user does not wish to participate, a determination is made as to whether the second timer has expired (1032). As noted above, the second timer tracks the time a user is allowed to view one instance of the base chat room without participating. If the second timer has expired, a determination is made as to whether the first timer has expired (1034). As noted above, the first timer tracks the time during which a user is allowed to view all instances of the base chat room without participating. If the first timer has expired, the method loops back to allow the user to select another base chat room (1004).

Figure 11D:
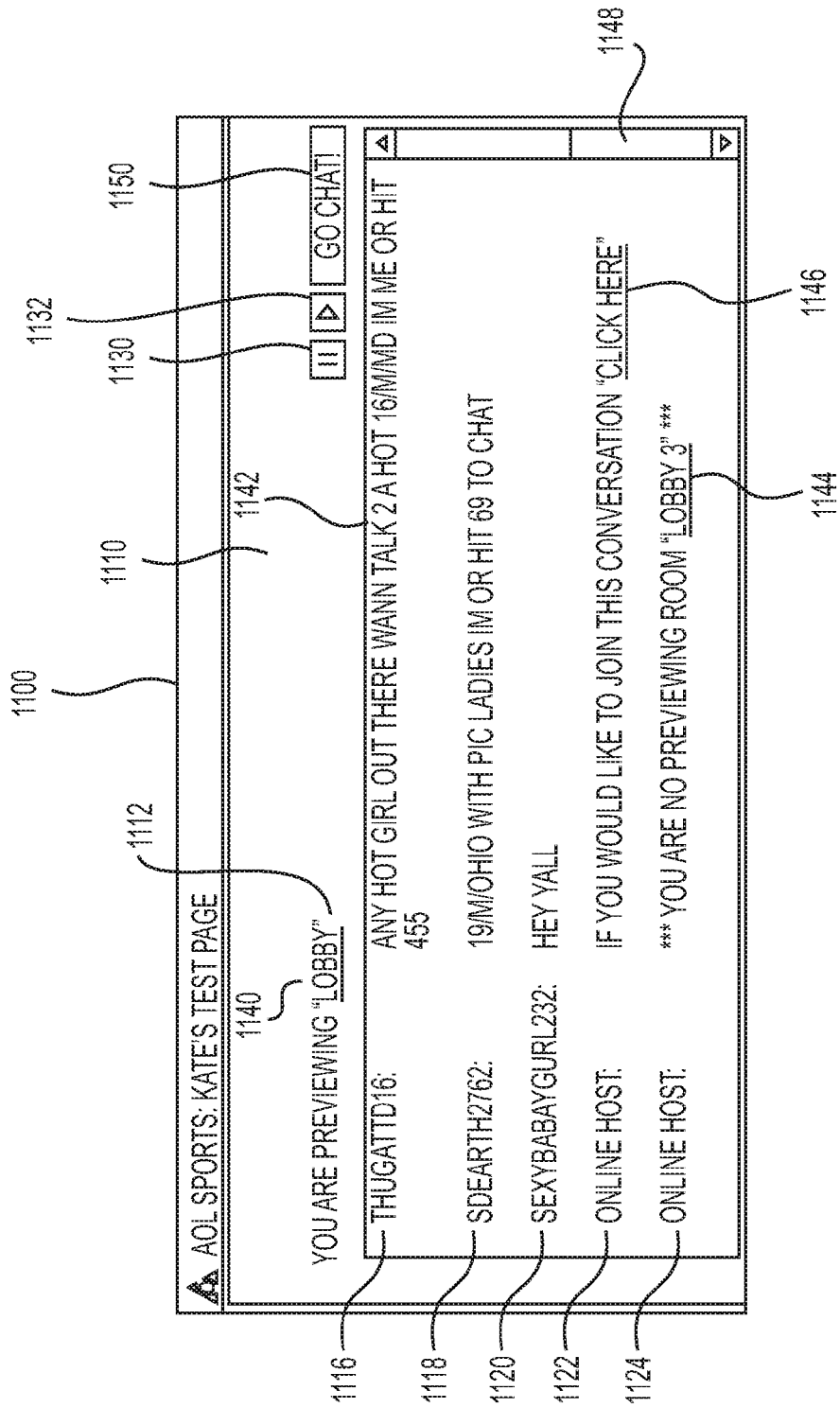
Figure 11E:
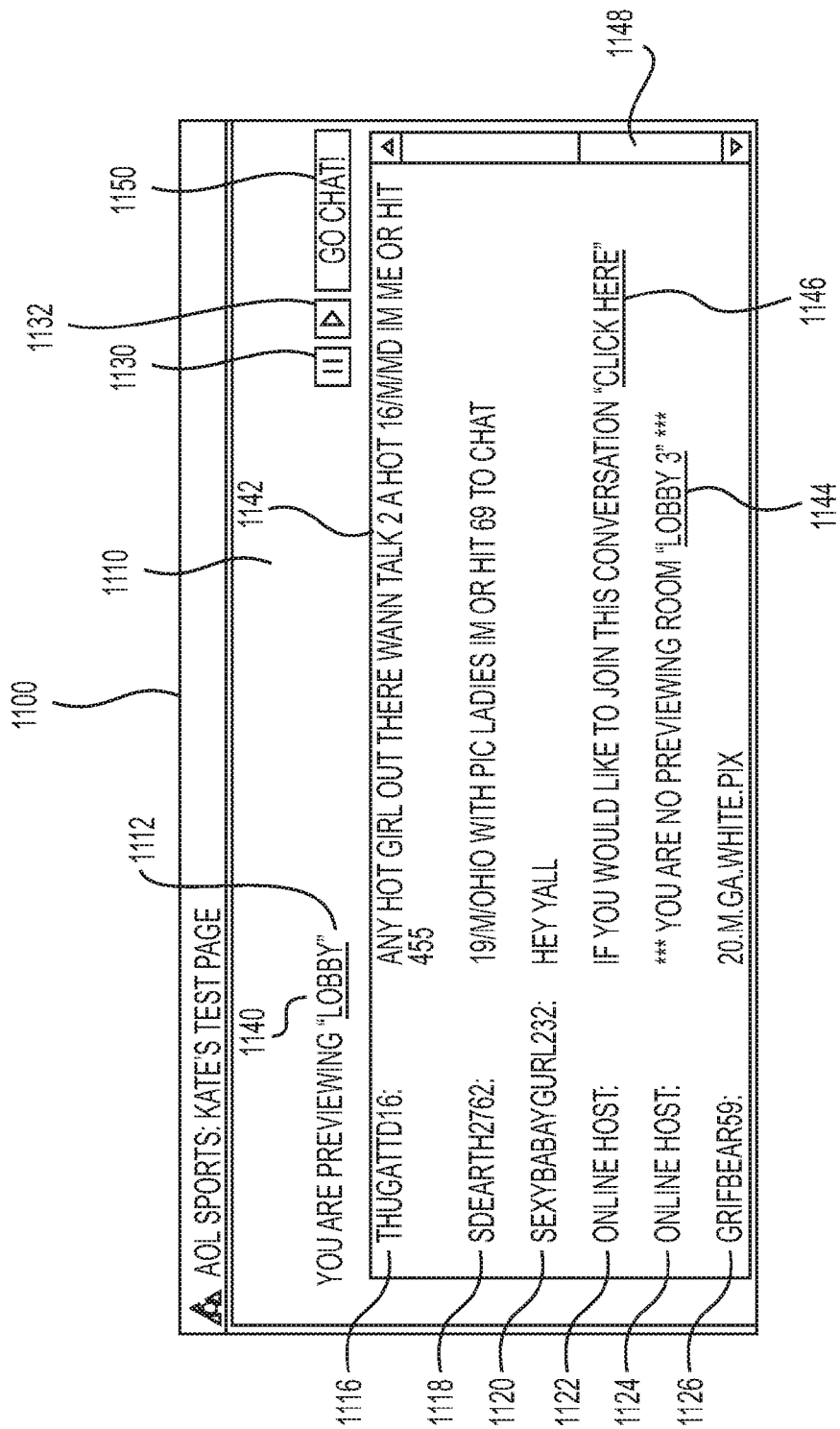

If second timer has expired and the first timer has not expired, the method loops back to restart the second timer (1012) and to select another instance of the base chat room (1014). For example, as shown on line 1124 in FIG. 11D, the online host sends a communication that the user is now previewing "Lobby 3." The text previously viewed from Lobby 2 continues to scroll up in the chat view window 1110 as new communications from Lobby 3, such as line 1126 in FIG. 11E, are viewed. In this manner, the user may view multiple instances of the base chat room without participating in any of these instances.

The user can indicate a desire to participate in the chat in one of the chat room instances in at least the following ways. As shown in FIG. 11A, the chat view window 1100 includes a link 1140 to the base chat room being viewed. Selecting base chat room link 1140 will take the user to the base chat room being viewed. As shown in FIGS. 11A and 11D, the chat view window 1100 includes a link 1142 to "Lobby 2" and a link 1144 to "Lobby 3," Selecting one of links 1142 or 1144 will take the user to Lobby 2 or Lobby 3, respectively. In addition, as shown in FIG. 11D, the chat view window 1100 includes a link 1146 that states "If you would like to join this conversation 'click here.'" Selecting link 1146 will take the user to Lobby 2 (i.e., the instance of the base chat room being viewed above this line of text). Chat view window 1100 includes a scroll bar 1148 that allows the user to scroll through the conversations that have been previously viewed to select the instance of the base chat room that the user would like to enter. Finally, chat view window 1100 includes a "Go Chat" button 1150, which, when selected, directs the user to the base chat room.

If the user selects one of these links then, a determination is made as to whether there are slots available in the selected instance of the base chat room (1036). If slots are available, the user enters the selected instance of the chat room to participate in the chat (1038). If all of the slots in the selected instance of the chat room are full, then the user is automatically directed to a different instance of the same chat room (1040). If all of the instances of the chat room are full, a new instance of the chat room may be created. The user is then authenticated into the online chat room, identified as a participant to the other participants, and enabled to create chat communications within the online chat room, for example, through a user interface such as the one shown in FIG. 4. In another implementation, if all of the slots in all of the instances of the chat room are full, the user may be asked to select a different base chat room.

Figure 12:
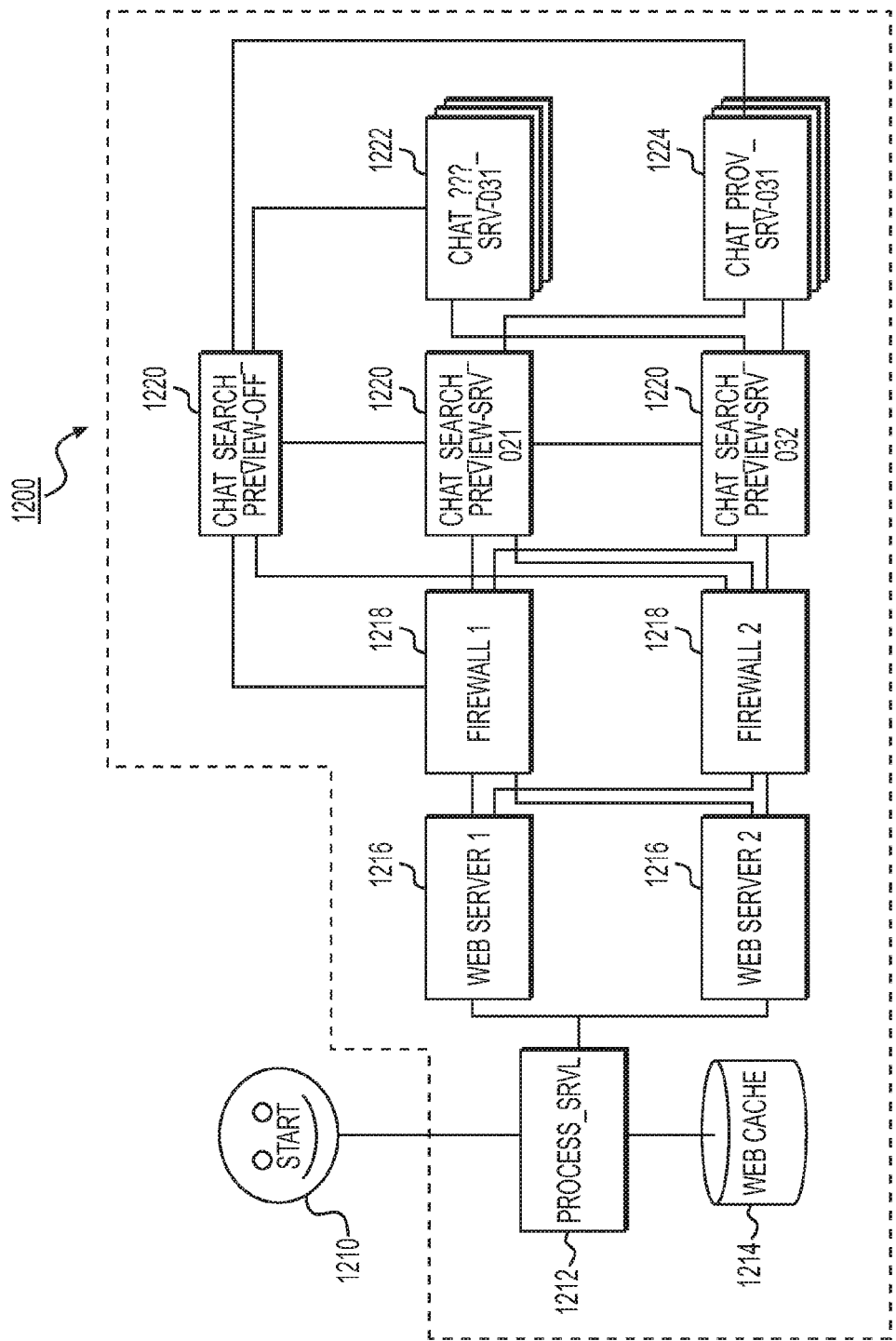
FIG. 12 is a block diagram of an exemplary system for viewing a chat room without participating in the chat room.

Referring to FIG. 12, an exemplary computer architecture of a system 1200 for implementing the above methods includes a proxy server 1212 that can be accessed by a client 1210, such as a personal computer, PDA, or cellular phone. The proxy server 1212 receives a user request to view a chat room, and is coupled to a web cache 1214 and to a number of web servers 1216. The proxy server 1212 checks whether communications from the selected chat room already have been saved in the web cache 1214. If not, the proxy server 1212 sends the request to one of the web servers 1216. If so, the proxy server 1212 retrieves the communications and transmits them to the client 1210 for display. The displayed communications appear to be live to the user. For example, each of the communications is displayed at a predetermined time interval. In another example, each of the accessed communications is associated with a time stamp and displayed at a time that corresponds to the time stamp.

Each web server 1216 is coupled to one or more chat search preview servers 1220 via firewall servers 1218. Each chat search preview server 1220 is coupled to a chat provider server 1224 and a chat fan server 1222. The chat provider server 1224 interfaces with the chat host 310 (FIG. 3) to obtain the name, category, URL, and description of each available chat room and transmits this information to the chat search preview servers 1220, which store this information in memory. The chat fan server 1222 retrieves a copy of each communication from the chat host 310 and feeds that communication to the chat search preview servers 1220.

The chat search preview server 1220 optionally time-stamps each incoming communication from the chat fan server 1222 and stores the incoming communications in a first buffer that has a predetermined size, e.g., 1 MB. When the first buffer is full, the chat search preview server 1220 stores the incoming communications in a second buffer that has a predetermined size, e.g., 1 MB. When the second buffer is full, the chat search preview server 1220 clears the first buffer and stores the incoming communications in the first buffer. Thus, the communications are stored in two rotating buffers. In other implementations, more or fewer buffers having larger or smaller sizes can be used to store the incoming communications.

The chat search preview server 1220 then creates a message having a header containing information from the chat provider server 1224 (e.g., name and description of chat room) and a body containing the communication(s) and the optional time stamp(s) from the chat fan server 1224. The chat search preview server 1220 transmits this message through the firewall 1218 to the web server 1216, which formats the message to be displayed on the client 1210, for example, according to the optional time stamp associated with each communication. The client 1210 replays each communication so that the chat appears to be live, as described above. If the user selects to become a participant in the chat, the client 1210 is redirected and connected to the chat host 310, as a participant system, as shown in FIG. 3.

A number of implementations have been described. Nevertheless, it will be understood that various modifications may be made. For example, communications from a chat room may be continuously accessed, optionally time stamped, and stored in a memory, and then replayed in a stream of communications, such that the system taps into the stream of messages and displays the messages to the user, when the user selects the chat room to view. The communications also may be displayed all at once so that they do not appear to be live. The timer that limits the amount of time a chat room may be viewed instead could be a counter that limits the number of communications that can be viewed. The system can randomly select between different base chat rooms. The system could prevent a user from viewing a chat room if there are no slots available for the user to enter the chat room. These and other implementations are within the scope of the following claims.

What is claimed is:

1. A system for viewing communications comprising:
at least one processor; and
at least one non-transitory memory containing instructions that when executed by the at least one processor cause the system to perform operations comprising:
providing information describing a plurality of communication sessions to a user;
receiving, based on input from the user, a selection of one of the plurality of communication sessions, the selected communications session including ongoing exchanges of electronic communications between two or more participants whose participation is mutually revealed to each other;
providing instructions to display, on a device of the user, the selected communications session, the display enabling the user to view communications exchanged between participants in the selected communications session without becoming a participant in the selected communications session;
receiving a request from the user to join the selected communications session; and
in response to the request, joining the user as a participant of the selected communications session.

2. The system of claim 1 wherein receiving the selection of one of the plurality of communication sessions comprises receiving a selection of a title or a description of the selected communications session by the user.

3. The system of claim 1 wherein receiving the selection of one of the plurality of communication sessions comprises receiving a selection of a communications session category by the user.

4. The system of claim 1 wherein receiving the selection of one of the plurality of communication sessions comprises receiving a selection of a web page comprising a portion that enables perception of the selected communications session by the user.

5. The system of claim 1, wherein joining the user as a participant of the selected communications session comprises identifying the user as a participant to at least one other participant.

6. The system of claim 5, wherein the operations performed by the at least one processor further comprise identifying the user as a participant to all other participants.

7. The system of claim 1, wherein joining the user as a participant of the selected communications session comprises enabling the user to exchange electronic communications with at least one other participant.

8. A computer-implemented method for viewing communications comprising:
   providing, by at least one processor, information describing a plurality of communication sessions to a user;
   receiving, by the at least one processor and based on input from the user, a selection of one of the plurality of communication sessions, the selected communications session including ongoing exchanges of electronic communications between two or more participants whose participation is mutually revealed to each other;
   providing, by the at least one processor, instructions to display, on a device of the user, the selected communications session, the display enabling the user to view communications exchanged between participants in the selected communications session without becoming a participant in the selected communications session;
   receiving, by the at least one processor, a request from the user to join the selected communications session; and
   in response to the request, joining, by the at least one processor, the user as a participant of the selected communications session.

9. The computer-implemented method of claim 8 wherein receiving the selection of one of the plurality of communication sessions comprises receiving a selection of a title or a description of the selected communications session by the user.

10. The computer-implemented method of claim 8 wherein receiving the selection of one of the plurality of communication sessions comprises receiving a selection of a communications session category by the user.

11. The computer-implemented method of claim 8 wherein receiving the selection of one of the plurality of communication sessions comprises receiving a selection of a web page comprising a portion that enables perception of the selected communications session by the user.

12. The computer-implemented method of claim 8, wherein joining the user as a participant of the selected communications session comprises identifying the user as a participant to at least one other participant.

13. The computer-implemented method of claim 12, further comprising identifying the user as a participant to all other participants.

14. The computer-implemented method of claim 8, wherein joining the user as a participant of the selected communications session comprises enabling the user to exchange electronic communications with at least one other participant.

15. A non-transitory memory containing instructions that when executed by at least one processor cause the at least one processor to perform operations comprising:
   providing, by at least one processor, information describing a plurality of communication sessions to a user;
   receiving, by the at least one processor and based on input from the user, a selection of one of the plurality of communication sessions, the selected communications session including ongoing exchanges of electronic communications between two or more participants whose participation is mutually revealed to each other;
   providing, by the at least one processor, instructions to display, on a device of the user, the selected communications session, the display enabling the user to view communications exchanged between participants in the selected communications session without becoming a participant in the selected communications session;
   receiving, by the at least one processor, a request from the user to join the selected communications session; and
   in response to the request, joining, by the at least one processor, the user as a participant of the selected communications session.

16. The non-transitory memory of claim 15 wherein receiving the selection of one of the plurality of communication sessions comprises receiving a selection of a title or a description of the selected communications session by the user.

17. The non-transitory memory of claim 15 wherein receiving the selection of one of the plurality of communication sessions comprises receiving a selection of a communications session category by the user.

18. The non-transitory memory of claim 15 wherein receiving the selection of one of the plurality of communication sessions comprises receiving a selection of a web page comprising a portion that enables perception of the selected communications session by the user.

19. The non-transitory memory of claim 15, wherein joining the user as a participant of the selected communications session comprises identifying the user as a participant to at least one other participant.

20. The non-transitory memory of claim 15, wherein joining the user as a participant of the selected communications session comprises enabling the user to exchange electronic communications with at least one other participant.

* * * * *